(12) United States Patent
Cevik et al.

(10) Patent No.: US 12,370,523 B2
(45) Date of Patent: Jul. 29, 2025

(54) Fe—Co CORE SHELL NANOSPHERES

(71) Applicant: Imam Abdulrahman Bin Faisal University, Dammam (SA)

(72) Inventors: Emre Cevik, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 455 days.

(21) Appl. No.: 17/954,865

(22) Filed: Sep. 28, 2022

(65) Prior Publication Data
US 2024/0100500 A1    Mar. 28, 2024

(51) Int. Cl.
*B01J 20/20*    (2006.01)
*B01J 20/02*    (2006.01)
*B01J 20/06*    (2006.01)
*B01J 20/28*    (2006.01)
*B01J 20/30*    (2006.01)
*C01G 49/00*    (2006.01)
*C01G 51/40*    (2025.01)
*C02F 1/28*    (2023.01)
B01J 8/00    (2006.01)
C02F 101/30    (2006.01)

(52) U.S. Cl.
CPC .......... *B01J 20/0229* (2013.01); *B01J 20/06* (2013.01); *B01J 20/28004* (2013.01); *B01J 20/28011* (2013.01); *B01J 20/28019* (2013.01); *B01J 20/3085* (2013.01); *C01G 49/0018* (2013.01); *C01G 51/40* (2013.01); *C02F 1/288* (2013.01); *B01J 8/00* (2013.01); *C02F 1/281* (2013.01); *C02F 2101/308* (2013.01); *C02F 2209/02* (2013.01); *C02F 2305/08* (2013.01)

(58) Field of Classification Search
None
See application file for complete search history.

(56) References Cited

FOREIGN PATENT DOCUMENTS

CN    102728385 B    4/2016
CN    105478155 A    4/2016
(Continued)

OTHER PUBLICATIONS

Wang et al. (Sensors and Actuators B: Chemical, 2020, 314, 128085). (Year: 2020).*

(Continued)

*Primary Examiner* — Clare M Perrin
(74) *Attorney, Agent, or Firm* — Oblon, McClelland, Maier & Neustadt, L.L.P.

(57) ABSTRACT

Fe—Co core-shell nanospheres and a method for producing the Fe—Co core-shell nanospheres are disclosed. Further disclosed is a method of reducing an organic contaminant in
(Continued)

a solution by mixing the Fe—Co core-shell nanospheres with the solution. The Fe—Co core-shell nanosphere includes a shell made of a material having a formula $Co_xFe_yO_{(x+1.5y)}$ and a hollow core. The Fe—Co core-shell nanospheres are produced by mixing cobalt nitrate and iron nitrate in a solvent mixture to form a first mixture and mixing urea with the first mixture to form a second mixture. The solvent mixture is removed from the second mixture to form a powder. The powder is ground to form the Fe—Co core-shell nanospheres.

12 Claims, 20 Drawing Sheets

(56) References Cited

FOREIGN PATENT DOCUMENTS

| | | | | |
|---|---|---|---|---|
| CN | 107032412 A | * | 8/2017 | |
| CN | 111871410 A | | 11/2020 | |
| CN | 113257579 A | | 8/2021 | |
| CN | 113976145 A | | 1/2022 | |
| GB | 2460064 A | * | 11/2009 | B01J 20/20 |

OTHER PUBLICATIONS

Sinko et al. (J Nanopart Res 2012, 14, 894). (Year: 2012).*
Machine translation of CN-107032412-A, pp. 1-6. (Year: 2017).*
Zhu et al. (Chemical Engineering Journal, 2019, 359, 1537-1549). (Year: 2019).*
Li et al. (J. Phys. Chem. C, 2009, 113, 2792-2797). (Year: 2009).*
Maaz et al. (Journal of Magnetism and Magnetic Materials, 2007, 308, 289-295). (Year: 2007).*
Hoang Vinh Tran, et al., "Carbon coated $MFe_2O_4$ (M=Fe, Co, Ni) magnetite nanoparticles: A smart adsorbent for direct yellow and moderacid red dyes", Korean Journal of Chemical Engineering, vol. 39, Jan. 9, 2022, pp. 431-439 (Abstract only).
Dapeng Sun, et al., "Magnetic $Fe_3O_4$@CoFe-LDH nanocomposite heterogeneously activated peroxymonosulfate for degradation of azo-dye AO7", RSC Advances, vol. 11, Issue 33, Jun. 7, 2021, pp. 20258-20267.
A. Honarbakhsh-Raouf, et al., "Synthesis and Characterization of $CoFe_2O_4/Ni_{0.5}Zn_{0.5}Fe_2O_4$ Core/Shell Magnetic Nanocomposite by the Wet Chemical Route", International Journal of Modern Physics B, vol. 24, No. 29, 2010, pp. 5807-5814 (Abstract only).
Usha Jinendra, et al., "Facile synthesis of $CoFe_2O_4$ nanoparticles and application in removal of malachite green dye", Green Materials, vol. 7, Issue 3, Sep. 2019, pp. 137-142 (Abstract only).

* cited by examiner

Fe—Co CORE SHELL NANOSPHERES

STATEMENT REGARDING PRIOR DISCLOSURE BY THE INVENTORS

Aspects of this technology are described in an article "Ultrahigh adsorption by regenerable iron-cobalt core-shell nanospheres and their synergetic effect on nanohybrid membranes for removal of malachite green dye" published in Journal of Environmental Chemical Engineering, 2022, Volume 10, Issue 3, on May 25, 2022, which is incorporated herein by reference in its entirety.

BACKGROUND

Technical Field

The present disclosure generally relates to the field of nanotechnology. More particularly, the present disclosure is related to nanospheres having a core-shell configuration and useful for removal of pollutants.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The presence of dyes in effluents is a major concern due to related environmental hazards. The presence of even small amounts of dyes in water (few ppm or ppb) can cause health issues and pose threats to ecological systems. More than 8000 dyes are routinely manufactured and used in paper, dyeing, pulp, textile, paint, and tannery industries.

A hazardous textile dye, malachite green (MG), is widely used in textile industries and is known to cause respiratory diseases, carcinogenesis, teratogenesis and mutagenesis. MG dye is less degradable, highly soluble in water, and quite difficult to remove from effluents using conventional treatment methods. Although several water treatment technologies like ion exchange method, ozonation, photocatalysis, coagulation-flocculation, etc., have been developed, these methods are either very expensive, or lead to generation of byproducts.

Use of nanomaterials has been explored as an alternative. Carbon nanomaterials are commonly used for wastewater treatment however these nanomaterials are generally uneconomical to produce and difficult to regenerate. Carbon nanotubes and graphene-based nanomaterials pose similar challenges. Metal or metal oxide-based nanomaterials are low-cost options, but these materials tend to aggregate and affect the adsorption rate. Further, removal of dyes using batch adsorption processes and membrane filtration processes presently have problems like inefficient adsorption, requiring a large volume of adsorbent material, or frequent fouling issues in membrane filtration processes.

In light of the aforementioned drawbacks, it is one objective of the present disclosure to provide a nanomaterial with superior adsorption characteristics. It is also an objective of the present disclosure to provide a low-cost adsorbent including a nanomaterial, having improved anti-fouling properties for removal of dyes with high contaminant removal efficiency. It is a third objective of the present disclosure to provide an adsorbent including a nanomaterial that may be employed during a batch adsorption process or integrated inside a membrane matrix for use in a membrane filtration process.

SUMMARY

In an exemplary embodiment, an Fe—Co core-shell nanosphere is provided. The Fe—Co core-shell nanosphere has a shell made of a material having a formula $Co_xFe_yO_{(x+1.5y)}$, wherein x is in the range of 1 to 15, and y is in the range of 1 to 25. The Fe—Co core-shell nanosphere also has a hollow core. The Fe—Co core-shell nanosphere further has an average particle diameter of 1 to 10 μm. In addition, the Fe—Co core-shell nanosphere has an average shell thickness of 10 to 300 nm. Moreover, the Fe—Co core-shell nanosphere has a crystallite size (D) of 10 to 30 nm.

In some embodiments, in the formula $Co_xFe_yO_{(x+1.5y)}$, where x is in the range of 1 to 5, and y is in the range of 1 to 10.

In some embodiments, the shell is made of $CoFe_2O_4$.

In some embodiments, the Fe—Co core-shell nanosphere has an average particle diameter of 1-5 μm.

In some embodiments, the Fe—Co core-shell nanosphere has an average shell thickness of 50-100 nm.

In some embodiments, the Fe—Co core-shell nanosphere has a crystallite size (D) of 10 to 30 nm.

In some embodiments, the Fe—Co core-shell nanosphere has a peak at 500 to 600 $cm^{-1}$ in a Fourier transform infrared spectrum with a transmittance in a range of 30 to 50%.

In some embodiments, a method for producing the Fe—Co core-shell nanosphere is disclosed. The method includes mixing cobalt nitrate and iron nitrate in a solvent mixture comprising alcohol and deionized water to form a first mixture. The method also includes mixing urea with the first mixture to form a second mixture. The method further includes removing the solvent mixture from the second mixture to form a powder and grinding the powder to form the Fe—Co core-shell nanosphere.

In some embodiments, the cobalt nitrate is cobalt nitrate hexahydrate.

In some embodiments, the iron nitrate is iron nitrate nonahydrate.

In some embodiments, a ratio of the alcohol and the deionized water is in a range of 10:1 to 1:5.

In some embodiments, a method of reducing an organic contaminant in a solution is disclosed. The method comprises mixing the Fe—Co core-shell nanosphere with the solution having the organic contaminant.

In some embodiments, the Fe—Co core-shell nanosphere reduces the organic contaminant concentration by adsorption.

In some embodiments, the organic contaminant is a malachite green (MG) dye or a cationic textile dye.

In some embodiments, the Fe—Co core-shell nanosphere is mixed with the solution for 70 to 200 minutes at 30 to 60° C.

In some embodiments, the solution comprises the organic contaminant at a concentration of 0.2 to 100 mg/L, and the Fe—Co core-shell nanosphere is mixed in the solution at a concentration of 0.1 to 2 mg/L and removes 80 to 99.9% of the organic contaminant.

In some embodiments, an organic contaminant removal efficiency of 80 to 99% is achieved with water flux of 180 to 260 $L/m^2$ h.

In some embodiments, an organic contaminant removal efficiency of 80 to 99% is achieved with 9 to 19% fouling resistances at 0.02 to 0.1 bar.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
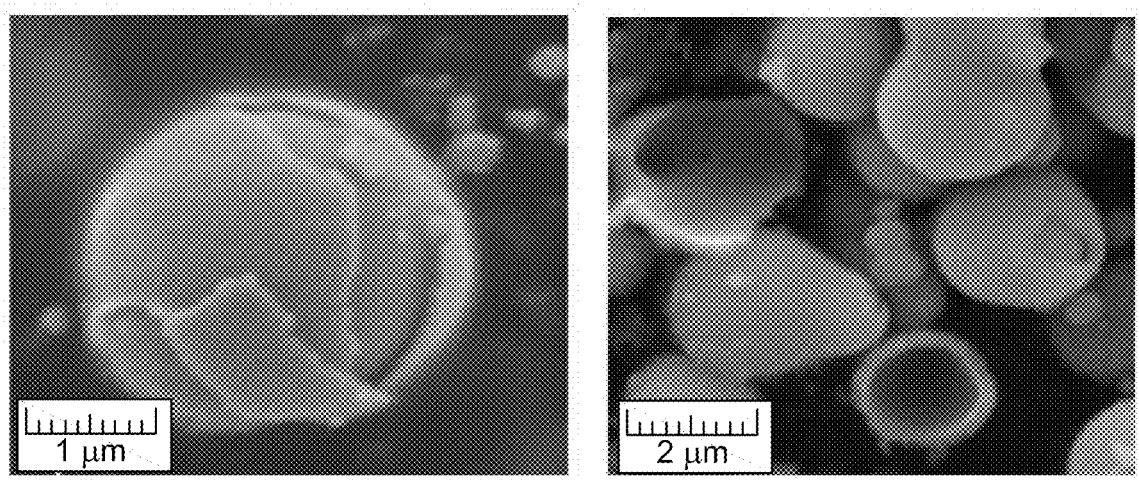
FIG. 1 shows SEM images of a Fe—Co core-shell nanosphere sample at two different magnifications, according to certain embodiments.

The present disclosure will be better understood with reference to the following definitions.

It will be understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

In the drawings, like reference numerals designate identical or corresponding parts throughout the several views. Further, as used herein, the words "a," "an" and the like generally carry a meaning of "one or more," unless stated otherwise. Also, the use of "or" means "and/or" unless stated otherwise. Similarly, "comprise," "comprises," "comprising" "include," "includes," and "including" are interchangeable and not intended to be limiting.

Furthermore, the terms "approximately," "approximate," "about," and similar terms generally refer to ranges that include the identified value within a margin of 20%, 10%, or preferably 5%, and any values there between. For example, if a stated value is about 8.0, the value may vary in the range of 8±1.6, ±1.0, ±0.8, ±0.5, ±0.4, ±0.3, ±0.2, or ±0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

As used herein, the term "particle," or "particles" generally refers to a substantially spherical or ellipsoid article(s), hollow or solid, that may have any diameter suitable for use in the methods and applications described below, including a nanosphere(s) and a nanoparticle(s), and other bodies of a similar nature known in the art.

As used herein, the term "nanoparticle" refers to a solid particle with a diameter in the nanometers (nm).

As used herein, the term "nanosphere" refers to particles having roughly a spherical shape but are not necessarily perfectly spherical. The term "nanospheres", thus includes nanoparticles having spherical, oval, ellipsoidal, roughly spherical, and other three-dimensional nearly spherical shape. In addition, the term "nanospheres" as used herein, refers to particles having a core-shelled structure, where (i) the core of the structure is substantially hollow with an average diameter in the micrometers (μm), and (ii) the shell of the structure has an average thickness in the nanometers. Thus, herein the term "nano" is used to describe features of the nanosphere other than the particle diameter which can be in the micro size. For example, a Fe—Co core-shell nanosphere has a hollow core with an average particle diameter of 1 to 10 μm, and a Fe—Co shell with an average shell thickness of 10 to 300 nm.

The terms "core-shell" or "core-shell nanospheres" as used herein, refer to nanospheres having a layered structural configuration such that the nanosphere has an inner portion (i.e., a core) and an outer portion (i.e., a shell), wherein the outer portion either completely or partially surrounds the inner portion.

The terms "hollow core" or "nanosphere(s) including/comprising hollow core" as used herein, refer to core-shell nanospheres having an inner portion including a cavity surrounded by a shell, wherein the cavity is not necessarily devoid of matter entirely. The term further includes nanospheres having a central cavity surrounded by a shell, wherein the central cavity is not necessarily devoid of matter entirely.

The terms "nanocomposite" or "nanocomposite membrane" as used herein, refer to a filtration and/or adsorption material including nanospheres, wherein said nanospheres are embedded and/or dispersed in a membrane forming matrix material. Non-limiting examples of membrane forming matrix material include synthetic polymers like PU, PVDF, PVA, PEEK, etc., and natural polymers like cellulose, chitosan, alginate, starch, etc.

The term "adsorbent" as used herein, refers to a substance capable of capturing molecules or particles from a bulk fluid phase, on/in its surface, pores, interstices, and/or cavities.

The term "adsorbate" as used herein, refers to a substance that gets captured by the adsorbent, as defined herein.

The term "regeneration" as used herein, refers to a process of rendering an adsorbent, which is saturated with an adsorbate, usable again by removing the captured adsorbate molecules from the adsorbent.

The term "room temperature" as used herein, refers to a temperature in range of 25±5° C.

Aspects of the present disclosure are directed towards Fe—Co core-shell nanospheres. Further, aspects of the present disclosure are directed towards a method of producing the Fe—Co core-shell nanospheres. Furthermore, aspects of the present disclosure are directed towards a method of reducing organic contaminant(s) from a solution using the Fe—Co core-shell nanospheres.

In an aspect of the present disclosure, an Fe—Co nanosphere is disclosed. The nanosphere may include a layered structural configuration such that the nanosphere may include a shell and a core. In some examples, the nanosphere may include a hollow core.

In a non-limiting example, the shell of the nanosphere is made of a material of general formula $Co_xFe_yO_{(x+1.5y)}$, wherein x is in the range of 1 to 15, y is in the range of 1 to 25. In some examples, the shell of the nanosphere is made of a material of general formula $Co_xFe_yO_{(x+1.5y)}$, wherein x is in the range of 1 to 5, y is in the range of 1 to 10. In some examples, the shell of the nanosphere is made of a material having a formula $CoFe_2O_4$. Preferably the shell consists of material of formula $Co_xFe_yO_{(x+1.5y)}$ and does not include a binder.

In some embodiments, the shell of the Co—Fe nanosphere an average thickness of 10 to 300 nm, preferably 20 to 250 nm, preferably 30 to 200 nm, preferably 40 to 150 nm, preferably 50 to 100 nm, or even more preferably 70 nm. Other ranges are also possible.

The Fe—Co particle may have nano-size features such as the grain size of the material from which the shell is made and/or the thickness of the shell while having a largest outer diameter of more than 1,000 nm (or 1 μm). In some embodiments, the core of the Co—Fe nanosphere is hollow. In some embodiments, the Fe—Co core-shell nanosphere may have an average particle diameter in range of 1 to 10 μm, preferably 1.1 to 9 μm, preferably 1.2 to 8 μm, preferably 1.3 to 7 μm, preferably 1.4 to 6 μm, preferably 1.5 to 5 μm, preferably 1.6 to 4 μm, preferably 1.7 to 3 μm, preferably 1.8 to 2.5 μm, or even more preferably 2 μm. Other ranges are also possible.

Figure 3:
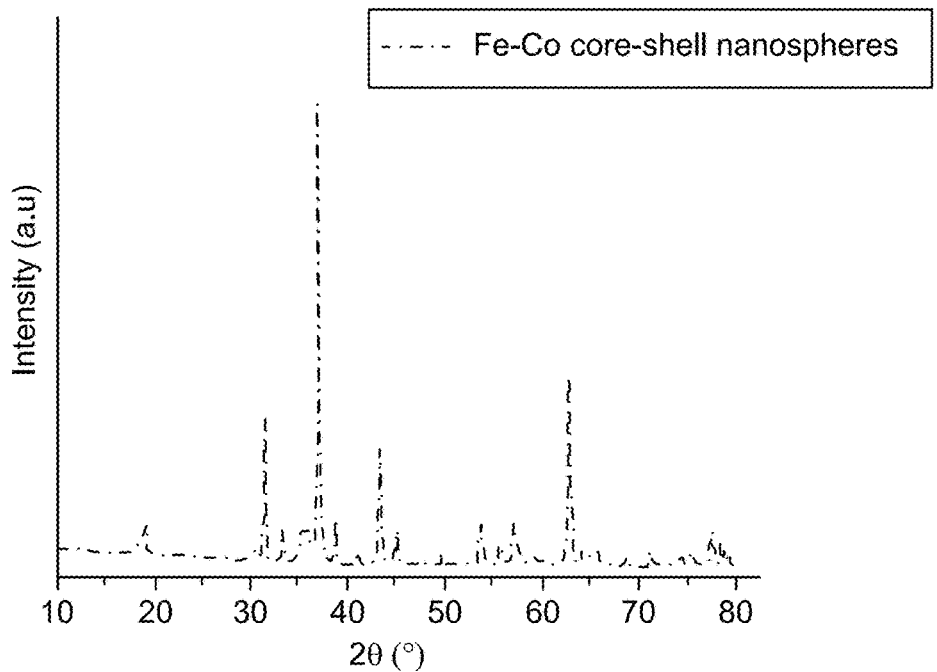
FIG. 3 shows XRD plot depicting a spectrum of a Fe—Co core-shell nanosphere sample, according to certain embodiments.

The structure and crystallite phase of the Fe—Co nanosphere is characterized by X-ray diffraction (XRD), as depicted in FIG. 3. In some embodiments, the XRD patterns are collected in a Rigaku miniFlex diffractometer equipped with a Cu-Kα radiation source ($\lambda$=0.15406 nm) for a 2θ range extending between 10 and 80°, preferably 20 and 70°, further preferably 30 and 60° at an angular rate of 0.005 to 0.04°s$^{-1}$, preferably 0.01 to 0.03°s$^{-1}$, or even preferably 0.02°s$^{-1}$. The crystallite size (D) of the Fe—Co nanosphere can thus be estimated using Scherrer's formula (D=k$\lambda$/β cos θ), where k is a dimensionless shape factor ($\approx$0.9), $\lambda$ is the X-ray wavelength, β is the full width-at-half-maximum length of the reflection and θ is the Bragg angle [S. Mitra, P. S. Veluri, A. Chakraborthy, R. K. Petla, Electrochemical properties of spinel cobalt ferrite nanoparticles with sodium alginate as interactive binder, ChemElectroChem. 1 (2014) 1068-1074].

In some embodiments, the Fe—Co core-shell nanosphere has a crystallite size (D) in range of 10 to 60 nm, preferably 10 to 50 nm, preferably 10 to 40 nm, preferably 10 to 30 nm. In some examples, the crystallite size (D) of the Fe—Co core-shell nanosphere is 17 nm. In some embodiments, the Fe—Co core-shell nanosphere has a peak at 400 to 700 cm$^{-1}$, preferably 400 to 650 cm$^{-1}$, preferably 450 to 620 cm$^{-1}$, preferably 500 to 600 cm$^{-1}$ in a Fourier transform infrared spectrum with a transmittance in a range of 20 to 70%, preferably 25 to 60%, preferably 30 to 50%. Other ranges are also possible.

In another aspect of the present disclosure, a method for producing Fe—Co core-shell nanospheres is disclosed. The method includes mixing a cobalt precursor and an iron precursor in a solvent to form a first mixture. In some examples, mixing is accomplished by constant agitation.

In a non-limiting example, the cobalt precursor is selected from a group including cobalt acetylacetonate, cobalt acetate, cobalt halide, cobalt nitrate, cobalt hydroxide, cobalt thiocyanate, cobalt oxalate dihydrate, cobalt phosphate hydrate, cobalt sulfate heptahydrate, cobalt sulfate hydrate, cobalt perchlorate hexahydrate, cobalt oxide, and cobalt carbonyl complex. In some examples, the cobalt precursor is cobalt nitrate. In some preferred examples, cobalt precursor is cobalt nitrate hexahydrate.

In another non-limiting example, the iron precursor is selected from a group including ammonium iron sulfate hexahydrate, iron perchlorate hydrate, iron oxide, iron halide, iron halide hydrate, iron sulfide, iron sulfate hydrate, iron sulfate heptahydrate, iron acetylacetonate, iron acetate, iron nitrate, iron hydroxide, iron thiocyanate, iron oxalate dihydrate, iron phosphate hydrate, iron oxide, and iron carbonyl complex. In some examples, the iron precursor is iron nitrate. In some preferred examples, iron precursor is iron nitrate hexahydrate.

The solvent utilized for preparing the first mixture may be a polar protic solvent, a polar aprotic solvent, or a non-polar solvent. Exemplary polar protic solvent that may be used include water, methyl alcohol, ethyl alcohol, propyl alcohol, isopropyl alcohol, butyl alcohol, sec-butyl alcohol, tert-butyl alcohol, isobutyl alcohol, benzyl alcohol, acetic acid, etc. Exemplary polar aprotic solvent that may be used include dichloromethane, tetrahydrofuran, ethyl acetate, acetonitrile, dimethylformamide, dimethyl sulfoxide, acetone, hexamethylphosphoric triamide, etc. Exemplary non-polar solvent that may be used include pentane, hexane, benzene, chloroform, diethyl ether, 1,4-dioxane, etc.

In some examples, a polar protic solvent is used for preparing the first mixture. In a non-limiting example, the solvent utilized is a mixture of a first component and a second component.

In some examples, the first component is a polar protic solvent. In some examples, the first polar protic solvent is an alcohol. In some examples, the alcohol is selected from a group including, but not limited to, methyl alcohol, ethyl alcohol, propyl alcohol, isopropyl alcohol, or butyl alcohol. In some examples, the second component is water. In some examples, water is deionized water or double deionized water.

It may be noted that the solvent mixture may include the first component and the second component in any proportion. In a non-limiting example, the ratio of the first component to the second component is in a range of 10:1 to 1:10, preferably 1:10 to 1:8, preferably 1:10 to 1:6, preferably 10:1 to 1:5. In some examples, the first component is quantitatively at least 10 times, preferably at least 9 times, preferably at least 8 times, preferably at least 7 times, preferably at least 6 times, preferably at least 5 times, preferably at least 4 times, preferably at least 3 times, preferably at least 2 times the second component. In some examples, the second component is quantitatively at least 5 times, preferably at least 4 times, preferably at least 3 times, preferably at least 2 times the first component. In some examples, the first component and the second component are in 1:1 ratio.

The method for producing Fe—Co core-shell nanospheres further includes removing the solvent mixture from the second mixture to form a powder and grinding the powder to form the Fe—Co core-shell nanospheres. In some examples, the removal of the solvent mixture is achieved by drying the second mixture in a temperature range of 30 to 120° C., preferably 30 to 110° C., preferably 40 to 100° C., preferably 40 to 90° C., preferably 40 to 80° C., preferably 40 to 70° C. In some examples, drying is carried out at 55° C. in an oven.

The dried second mixture, in some examples, is further heat treated under an inert atmosphere at an elevated temperature at a heating rate of at least 1-10° C./min, preferably at least 2-8° C./min, preferably at least 3-7° C./min, preferably at least 5° C./min. In a non-limiting example, the elevated temperature is in a range of 50 to 2000° C., preferably 80 to 1800° C., preferably 100 to 1600° C. In some examples, the elevated temperature is in a range of 300° C. to 1000° C. In some examples, the heat treatment temperature is 400° C. Further, the inert atmosphere under which heat treatment takes place, in a non-limiting example, may be selected from a group including nitrogen, argon, and helium. In some examples, the inert atmosphere is nitrogen air atmosphere.

The powder obtained by the method of present disclosure may be utilized to produce a variety of adsorbents capable of carrying out purification, filtration, and/or adsorption processes, e.g., to remove organic dyes from aqueous solutions. In some examples, the nanospheres are filled in a column for use as an adsorbent column or bed. In some examples, the nanospheres are attached to or immobilized on a membrane for use as adsorption filter membrane. In some examples, the nanospheres are dispersed in a membrane matrix, preferably polymeric, for use as adsorption filter membrane. In some examples, the nanospheres are attached to or immobilized on inert beads and packed in a column for use as an adsorbent column.

In another aspect of the present disclosure, a method of reducing contaminant(s) in a solution is disclosed. The method includes contacting the Fe—Co core-shell nanospheres of the present disclosure with the solution having at least one contaminant. The removal or reduction of the concentration of at least one organic contaminant in the solution is achieved by the process of adsorption.

In some examples, the Fe—Co core-shell nanospheres are mixed with the contaminated solution for reducing at least one contaminant in the solution. In some examples, an adsorbent column filled with the Fe—Co core-shell nanospheres is contacted with the contaminated solution for reducing at least one contaminant in the solution. In some examples, an adsorption filter membrane including the Fe—Co core-shell nanospheres is contacted with the contaminated solution for reducing at least one contaminant in the solution.

It may be noted that any contaminated solution may be treated with the nanospheres of the present disclosure. In a non-limiting example, the contaminated solution may be wastewater from oil industries, paint industries, tanning and yarn dying industries, wastewater treatment industries, pollutants separation industries, petrochemical industries, or any other industry known to generate contaminated effluents. In some examples, the contaminated solution may be wastewater from textile, dying, or tanning industries.

The contaminant present in the solution or wastewater may be an organic contaminant or an inorganic contaminant. In a non-limiting example, at least one contaminant is an organic contaminant selected from a group including dyes or dyestuffs, humic substances, phenolic compounds, petroleum products, petroleum byproducts, surfactants, pesticides, pharmaceuticals, polychlorinated biphenyls, phthalates, dioxins, food coloring, and triarylmethanes. In some examples, at least one organic contaminant is a dye. In some examples, the dye is a cationic textile dye, methyl violet dye, fuchsine dye, phenol dye, malachite green dye, Victoria blue dye, or xanthene dye. In some examples, the dye is malachite green (MG) dye. In another non-limiting example, at least one contaminant is an inorganic contaminant selected from a group including heavy metals, nitrates, ammonia, ammonia derivatives, perchlorates, and sulfides.

In some examples, the method of reducing at least one organic contaminant in a solution includes mixing the nanospheres with the solution for 50 to 300 minutes, preferably 60 to 250 minutes, preferably 70 to 200 minutes at 20 to 100° C., preferably 30 to 90° C., preferably 30 to 80° C., preferably 30 to 70° C., preferably 30 to 60° C. The nanospheres may be mixed in the solution at a concentration of 0.01 to 5 mg/L, preferably 0.02 to 3 mg/L, preferably 0.03 to 2.5 mg/L, preferably 0.05 to 2 mg/L. In some examples, the nanospheres are mixed in the solution at a concentration of 0.1 to 2 mg/L. Other ranges are also possible.

The nanospheres may be used to treat a solution having organic contaminant(s) at any concentration level. The nanospheres may be used to treat a solution having organic contaminant(s) at concentration in range of 0.1 to 800 mg/L, preferably 0.1 to 700 mg/L, preferably 0.1 to 600 mg/L, preferably 0.2 to 500 mg/L, preferably 0.2 to 400 mg/L. In some examples, the nanospheres may be used to treat a solution having organic contaminant(s) at concentration in range of 0.2 to 200 mg/L. In some examples, nanospheres may be used to treat a solution having organic contaminant (s) at concentration in range of 0.2 to 150 mg/L. In some examples, nanospheres may be used to treat a solution having organic contaminant(s) at concentration in range of 0.2 to 100 mg/L. Other ranges are also possible.

The nanospheres of the present disclosure can remove 70 to 99.9%, preferably 75 to 99.9%, preferably 80 to 99.9% of at least one organic contaminant from the solution. In some examples, the nanospheres or adsorption filter membranes of the present disclosure achieve an organic contaminant removal efficiency of 70 to 99.9%, preferably 75 to 99.9%, preferably 80 to 99.9% with water flux of 100 to 300 $L/m^2$ h, preferably 150 to 290 $L/m^2$ h, preferably 180 to 260 $L/m^2$ h. In some examples, the nanospheres or adsorption filter membranes exhibit an organic contaminant removal efficiency of 70 to 99.9%, preferably 75 to 99.9%, preferably 80 to 99.9% with 5 to 25%, preferably 6 to 23%, preferably 9 to 19% fouling resistances at 0.01 to 0.2, preferably 0.02 to 0.15, preferably 0.02 to 0.1 bar. Other ranges are also possible.

The examples below are intended to further illustrate protocols for preparing, characterizing, and using the Co—Fe nanosphere and for performing the method described above and are not intended to limit the scope of the claims.

Where a numerical limit or range is stated herein, the endpoints are included. Also, all values and subranges within a numerical limit or range are specifically included as if explicitly written out.

EXAMPLES

The present disclosure is further described by the following examples. These are not intended to limit the scope of the disclosure but represent some preferred aspects of the present disclosure.

Materials

Iron nitrate nonahydrate $(Fe(NO_3)_3 \cdot 9H_2O)$, urea $(CH_4N_2O)$, and cobalt nitrate
hexahydrate $(Co(NO_3)_2 \cdot 6H_2O)$ were purchased from Sigma Aldrich. The malachite green (MG) dye was brought from Merck. Isopropyl alcohol $(C_3H_6O)$, Polyvinylidene fluoride (HSV 900 PVDF) and 1-methyl-2-pyrrolidone (NMP) with analytical purity of 99.5% were obtained from MTI corporation. Double deionized water was used in all examples disclosed herein.

Example 1: Preparation of Fe—Co Core-Shell Nanospheres

The nanospheres were produced via hydrothermal method. 0.2M solution of cobalt nitrate hexahydrate and 0.1M solution of Iron nitrate nonahydrate were dissolved in a mixed solution including 15 ml of isopropyl alcohol and 5 ml of deionized water. The solution for mixed for 10 minutes by constant agitation. 4.8 g of urea was added into the solution afterwards and stirring was continued for another 30 minutes. Subsequently, the solution was transferred into a 100 mL Teflon-lined stainless-steel autoclave and was held at 120° C. for 12 hours. After 12 hours, the solution was cooled down to room temperature and washed five times with deionized water. The solution was placed in oven for drying at 55° C. Finally, the solution was treated at 400° C. for 2 hours with a heating rate of 5° C./min, under nitrogen air atmosphere. A black coloured powdered sample ($CoFe_2O_4$) was obtained. The powder was finely ground and stored in airtight containers.

Characterization of Fe—Co Core-Shell Nanospheres

Example 2: Structure and Morphology Analysis

SEM micrographs, TEM micrographs, and XRD plots were employed to investigate morphology, size, and structure of the sample of Fe—Co nanospheres produced. The surface morphology of the nanospheres was studied through a scanning electron microscope (TESCAN Vega3). The detailed morphology and structure of the nanospheres, was studied by transmission electron microscopy (TEM) and electron diffraction (FEI, Morgagni 268 at 80 kV). The structure and crystallite phase of the nanospheres was obtained by powder X-ray diffraction (PXRD) measurements in the 2θ range from 10 to 80° using Rigaku miniFlex.

Figure 2:
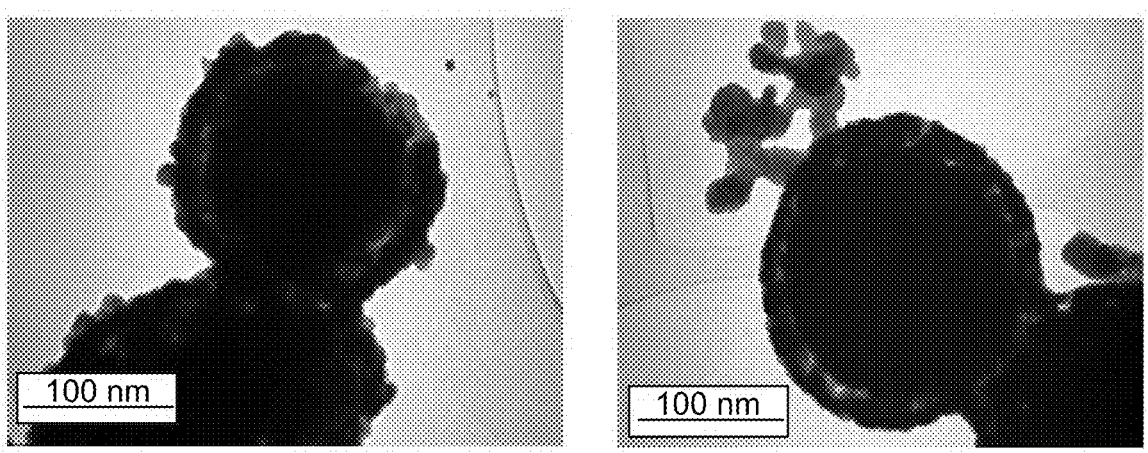
FIG. 2 shows TEM images of a Fe—Co core-shell nanosphere sample at two different magnifications, according to certain embodiments.

Referring to FIG. 1, SEM images of a Fe—Co core-shell nanosphere sample at two different magnifications is shown. Referring to FIG. 2, TEM images of a Fe—Co core-shell nanosphere sample is shown. Referring to FIG. 3, PXRD plot depicting a spectrum of a Fe—Co core-shell nanosphere sample is shown.

As shown in FIG. 1, SEM analysis revealed that the nanospheres have a spherical hollow shape with an average diameter of 2 μm. TEM images, as shown in FIG. 2, revealed nanospheres having 70 nm thick shell.

Indexing was carried out to confirm the lattice structure. As seen in FIG. 3, the lattice planes (111), (220), (311), (222), (400), (331), (422), (511) and (440) were observed at 19.33°, 31.45°, 37.13°, 39.10°, 43.02°, 53.20, 57.30° and 63.15°, respectively, index to the cubic spinel ($CoFe_2O_4$). No impurity phases were found, indicating that the $CoFe_2O_4$ obtained was pure. The crystallite size (D) of the as-prepared nanosphere sample was estimated to be 17 nm.

Example 3: Fourier-Transform Infrared (FTIR) Spectroscopy

FTIR analysis of the as-produced Fe—Co core-shell nanosphere sample was performed to investigate the presence of various important functional groups in the sample through Perkin Elmer Fourier-transform infrared (FT-IR) spectrophotometer (Spectrum Two™) in a wavelength range selected was 4000-400 $cm^{-1}$ at a specific resolution (4 $cm^{-1}$).

Figure 4:
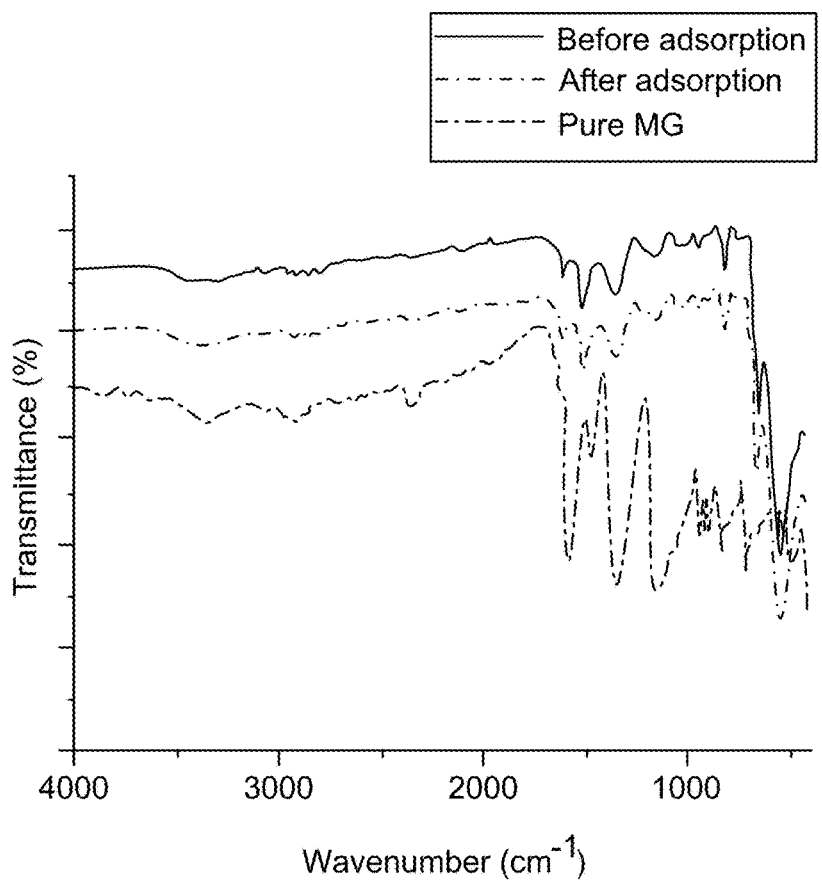
FIG. 4 shows FTIR plot of a Fe—Co core-shell nanosphere sample, according to certain embodiments.

Referring to FIG. 4, FTIR plot of a Fe—Co core-shell nanosphere sample is shown. As shown, FTIR analysis was also performed on a MG dye sample, and a sample of Fe—Co nanospheres having MG dye molecules adsorbed thereon. The sample of Fe—Co nanospheres having MG dye adsorbed thereon was prepared in accordance with method disclosed.

As seen in FIG. 4, characteristic bands of the functional groups in MG dye, Fe—Co nanospheres before adsorption, and Fe—Co nanospheres after adsorption are revealed. The broad peaks indicating the presence of —OH groups in MG dye molecules, Fe—Co nanospheres before adsorption, and Fe—Co nanospheres after adsorption, are observed at 3359, 3390 and 3388 $cm^{-1}$, respectively. For MG dye, the peaks observed at 2928 and 2355 $cm^{-1}$ are due to the C—H stretching mode and symmetric vibration of tertiary amine salt, respectively, which reduced and disappeared after adsorption and shifted to a low wavenumber, indicating that the MG tertiary amines were converted. Specific peaks between 550 and 1480 $cm^{-1}$ for MG dye suggest mono-distributed and para-distributed benzene rings, supporting the strong peak at 1580 $cm^{-1}$ related to the C=C stretching of the benzene ring and the peak at 1180 $cm^{-1}$ corresponding to the C—N stretching vibration. The intensity of the peaks was decreased for Fe—Co nanospheres before and after adsorption and shifted to a low wavenumber. The FTIR spectrum of Co—Fe nanospheres exhibits a sharp peak at 555 $cm^{-1}$, which is attributed to the Fe—O and Co—O vibrations.

Example 4: Batch Adsorption Studies

The potential of Fe—Co nanospheres to uptake malachite green (MG) dye was evaluated by conducting multiple batch mode experiments. In all batch experiments, 2 mL of MG dye was taken in a 2 mL test tube and was agitated at 500 rpm at room temperature. The effect of different adsorption parameters such as pH, contact time, initial dye concentration, adsorbent dose, and temperature, was studied on dye removal from water. 0.1N HCl and 0.1N NaOH were used to adjust the pH of the sample MG dye solutions.

After each sorption run, samples were centrifuged at 8000 rpm for 1 minute, and then the remaining concentration of MG dye in the supernatant was evaluated through UV-VIS spectrophotometer (Nanodrop 2000 C) at 617 nm. All experimental procedures were conducted in triplicate and average values of parameters were calculated.

Example 5: Effect of pH on MG Dye Removal

Figure 5A:
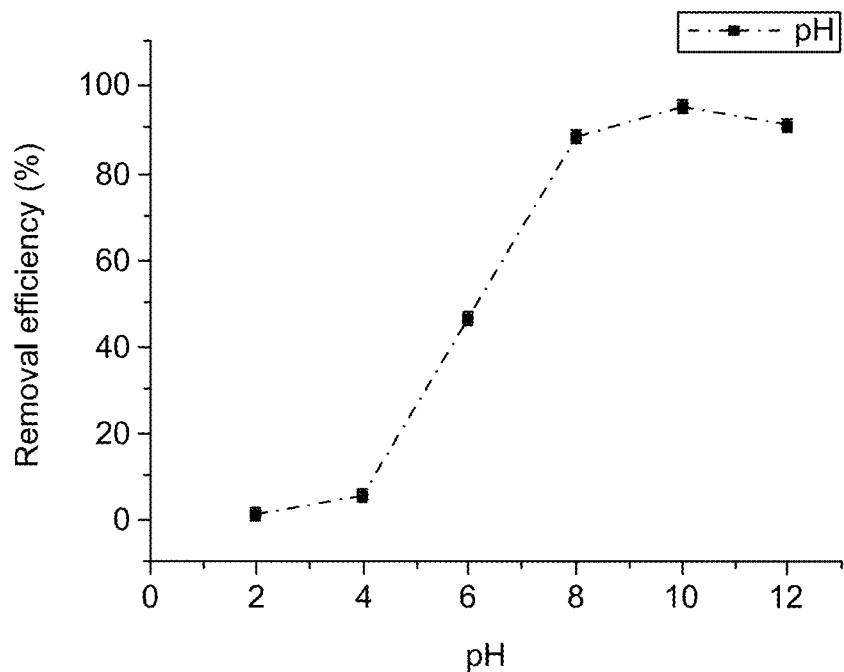
FIG. 5A shows effect of pH on MG dye removal during a batch adsorption study, according to certain embodiments.

Referring to FIG. 5A, effect of pH on MG dye removal during a batch adsorption study is shown. FIG. 5A depicts the effect of changing pH from 2 to 12 on the percentage removal of MG dye molecules, at initial adsorbent dose of 2 mg, initial contact time of 120 minutes, and initial dye concentration of 100 ppm.

As seen in FIG. 5A, under acidic conditions (pH: 2-6), approximately 47% dye removal was achieved. At lower pH values, presence of abundant $H^+$ ions led to protonation on the surface of nanospheres which decreased interactions between cationic MG dye molecules and positively charged adsorbent nanosphere surface. Consequently, adsorption was not favored at lower pH values. In contrast, as the pH was increased to 10 (basic conditions), adsorbent surface became negatively charged due to the presence of $OH^-$ ions, therefore, electrostatic interactions between adsorbent nanosphere surface and MG dye molecules resulted in fast dye uptake and approximately 95% dye removal was achieved.

Example 6: Effect of Contact Time on MG Dye Removal

Figure 5B:
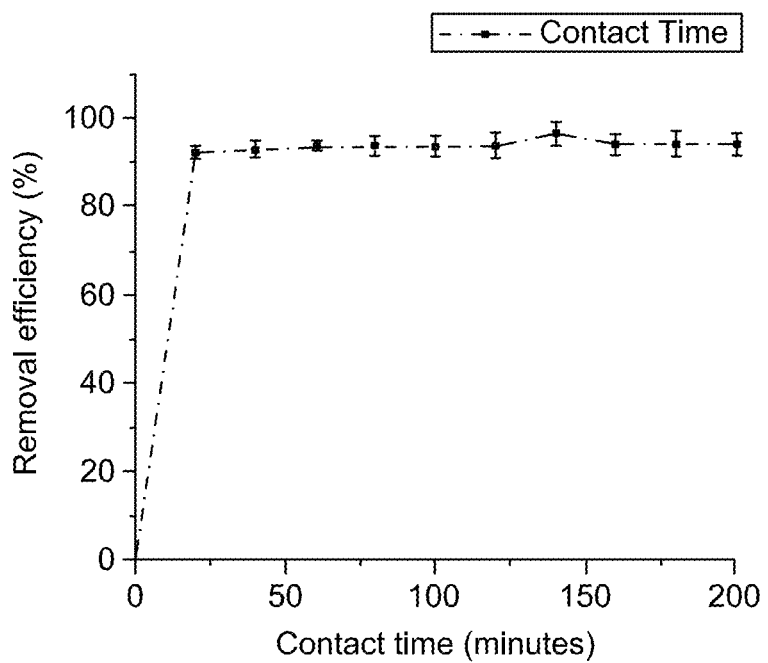
FIG. 5B shows effect of contact time on MG dye removal during a batch adsorption study, according to certain embodiments.

Referring to FIG. 5B, effect of contact time on MG dye removal during a batch adsorption study is shown. FIG. 5B depicts the impact of contact time (20 minutes-200 minutes) on the percentage MG dye removal, at optimized pH value of 10, fixed initial adsorbent dose of 2 mg and initial dye concentration of 100 ppm. As seen in FIG. 5B, dye removal efficiency increased within first 20 minutes due to the existence of a high concentration gradient during adsorption process and the availability of abundant active binding sites on the surface of the nanospheres. Afterwards, MG removal rate slowed down and no significant change in removal efficiency was observed. Finally, the equilibrium was achieved at 140 minutes with the maximum dye removal efficiency of 96.5%. Further increase in contact time resulted in slight desorption phenomenon along with over-saturation of available binding sorption sites which reduced scavenging of MG dye molecules from solution.

Example 7: Effect of Initial Dye Concentration on MG Dye Removal

Figure 5C:
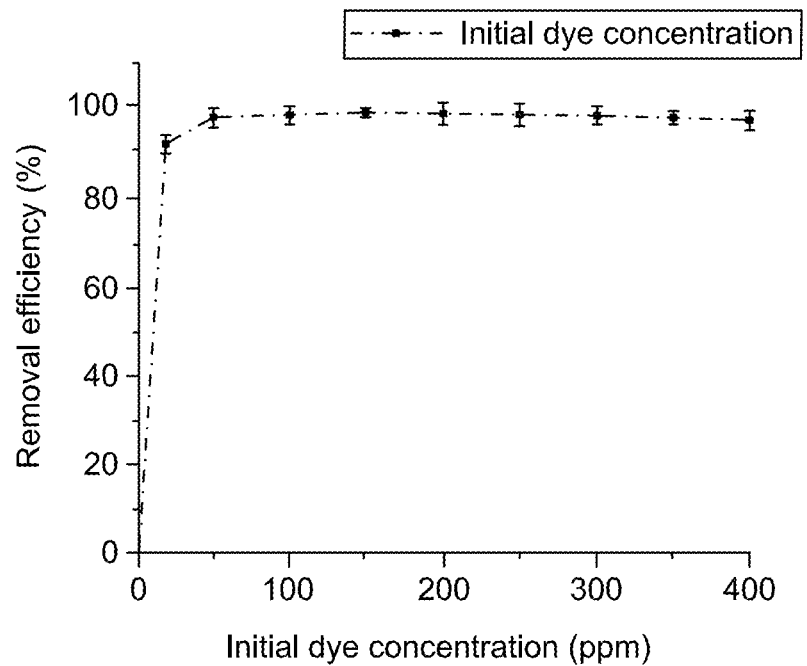
FIG. 5C shows effect of initial dye concentration on MG dye removal during a batch adsorption study, according to certain embodiments.

Referring to FIG. 5C, effect of initial dye concentration on MG dye removal during a batch adsorption study is shown. The effect of initial MG dye concentration was studied by changing concentrations in the range of 20 ppm to 400 ppm, at pH 10, contact time of 140 minutes and initial adsorbent dose of 2 mg.

As seen in FIG. 5C, initially 91.6% dye uptake was observed at low initial concentration of 20 ppm due to the presence of abundant voids on the surface of the nanospheres. The removal of dye gradually increased with further increase in dye concentration and the maximum removal efficiency of 98.5% was achieved at 150 ppm. However, after 150 ppm, dye removal declined slowly because of maximum saturation of sorption sites on the adsorbent nanosphere surface.

Example 8: Effect of Adsorbent Dose on MG Dye Removal

Figure 5D:
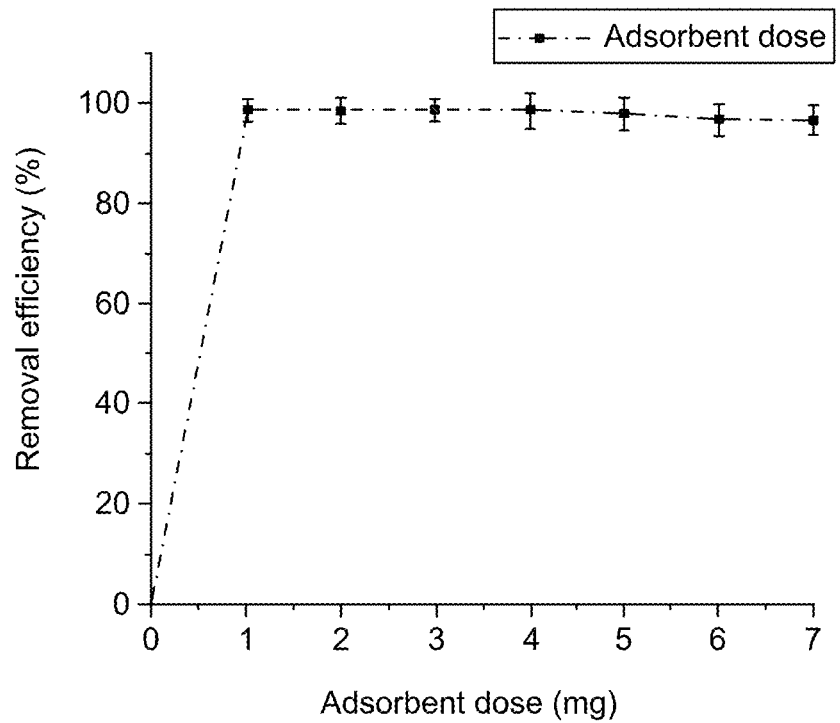
FIG. 5D shows effect of adsorbent dose on MG dye removal during a batch adsorption study, according to certain embodiments.

Referring to FIG. 5D, effect of adsorbent dose on MG dye removal during batch adsorption studies is shown. The Fe—Co nanosphere dose was varied in the range of 1 mg to 7 mg, under previously optimized conditions i.e., pH 10, contact time 140 minutes, and initial dye concentration 150 ppm.

As seen in FIG. 5D, maximum removal efficiency of 98.6% was achieved with just 1 mg of adsorbent dose. This could be linked to the higher surface area and initial availability of abundant binding sites on the adsorbent surface, for the MG molecules. Further increase in dosage (2 mg-7 mg) slowly declined the dye removal to 96.6% due to cohesive forces between sorbent particles causing aggregation or agglomeration which in turn led to reduction in surface area of adsorbent per unit weight.

Figure 5E:
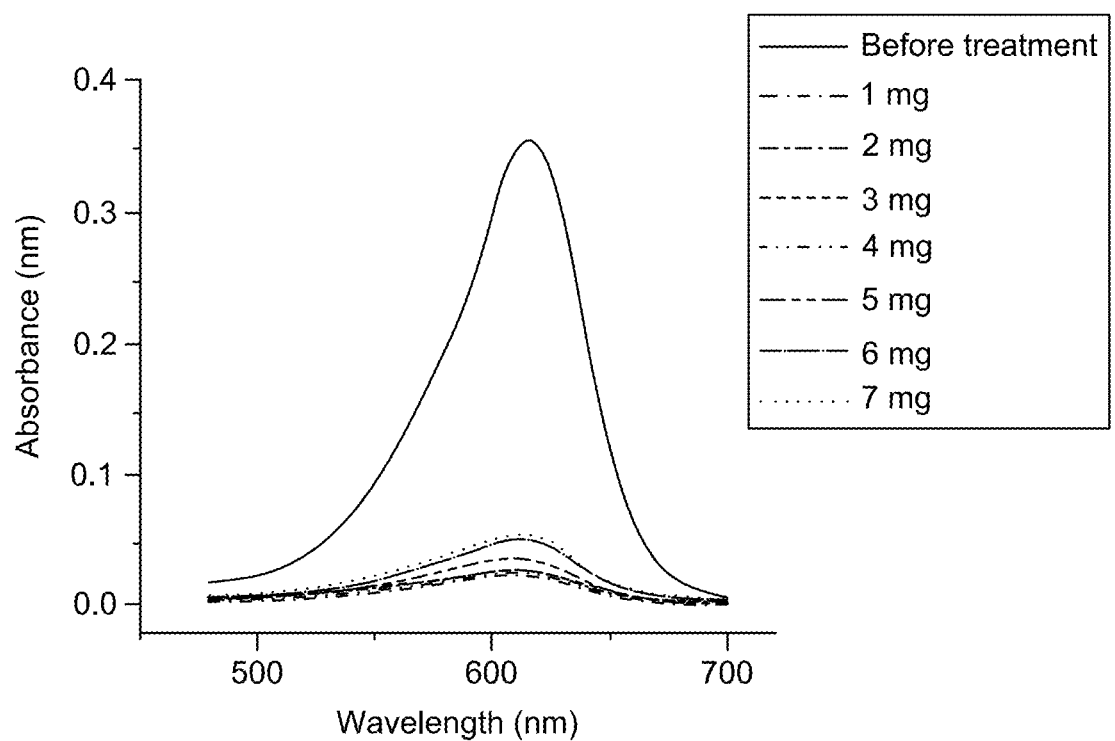
FIG. 5E shows evolution of UV-VIS absorption spectra for MG dye corresponding to varying adsorbent doses during a batch adsorption study, according to certain embodiments.

Referring to FIG. 5E, evolution of UV-VIS absorption spectra for MG dye corresponding to varying adsorbent doses during the batch adsorption study is shown. Variations in UV-VIS absorption spectra, were obtained by changing adsorbent doses from 1 mg-7 mg. MG removal was investigated by obtaining results from the absorbance peaks at 665 nm. As seen in FIG. 5E, minimum absorbance is observed at 1 mg adsorbent dose indicating maximum dye removal.

Example 9: Effect of Temperature on MG Dye Removal

Figure 5F:
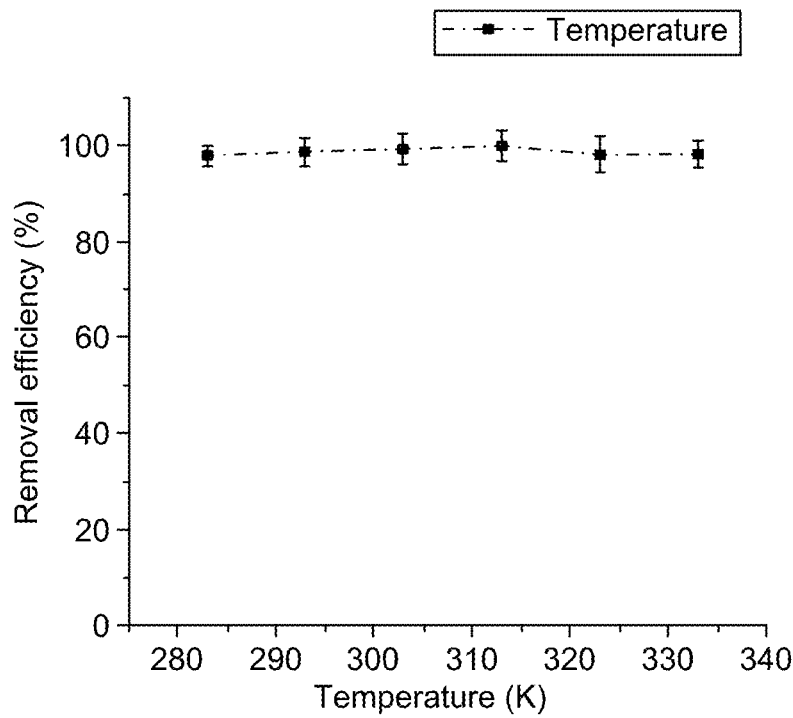
FIG. 5F shows effect of temperature on MG dye removal during a batch adsorption study, according to certain embodiments.

Referring to FIG. 5F, effect of temperature on MG dye removal during a batch adsorption study is shown. The effect of changing temperature from 283 K to 333 K, at already optimized conditions (pH: 10, initial dye concentration: 150 ppm, contact time: 140 minutes and adsorbent dose: 1 mg) was evaluated.

As seen in FIG. 5F, initially with rise in temperature, high dye removal was observed, and almost complete MG dye removal of 99.8% was achieved at 313 K. This could be attributed to the increased rate of diffusion of the solute through liquid to the available sorption sites, which decreased viscosity rate of the solution. Further increase in temperature (up to 333 K) resulted in slightly reduced dye removal (98%) which might be because of the weak adsorptive forces between active binding sites of Fe—Co adsorbent and dye moieties, at elevated temperature values.

Adsorption Mechanism Studies

Example 10: Adsorption Isotherms

Three linear isotherm adsorption models including Langmuir, Freundlich and Temkin isotherms, were evaluated to understand the adsorption phenomenon, surface affinity of MG dye molecules onto to Fe—Co nanosphere adsorbent and surface properties of Fe—Co nanosphere adsorbent.

Figure 6A:
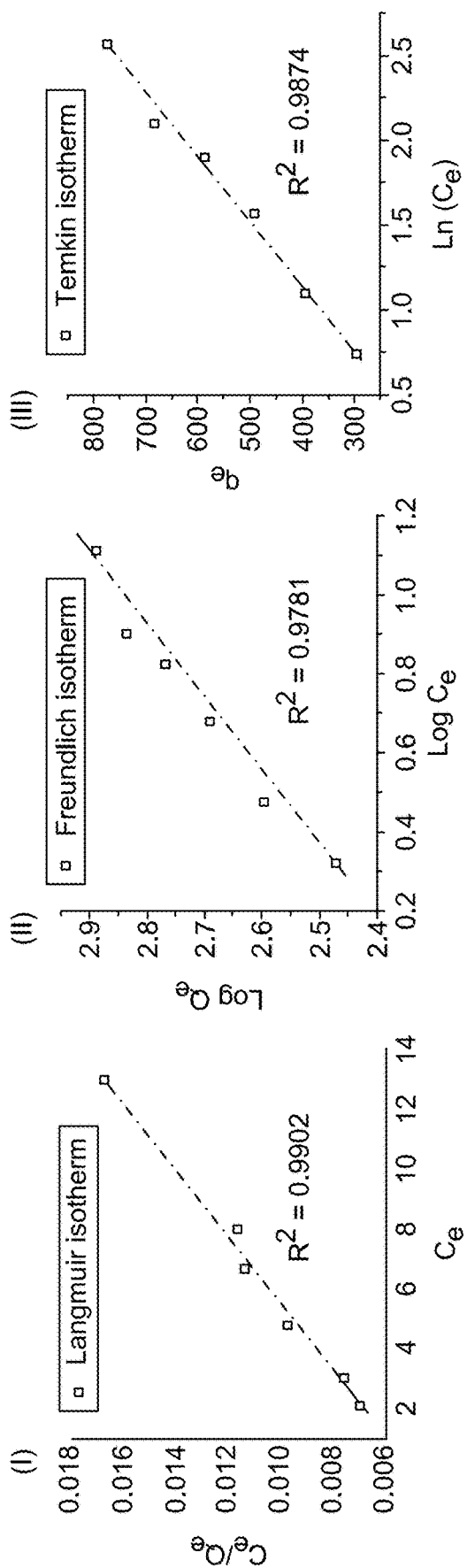
FIG. 6A shows plots of (I) Langmuir isotherm model, (II) Freundlich isotherm model, and (III) Temkin isotherm model, for MG dye adsorption onto Fe—Co core-shell nanospheres, according to certain embodiments.

Referring to FIG. 6A, plots of (I) Langmuir isotherm model, (II) Freundlich isotherm model, and (III) Temkin isotherm model, for MG dye adsorption onto Fe—Co core-shell nanospheres are presented. All calculated equilibrium parameters obtained from the plots depicted in FIG. 6A are given in Table 1.

TABLE 1

Parameters of adsorption models for adsorption of MG dye

| Adsorption model | Parameter | Value |
| --- | --- | --- |
| Langmuir isotherm | $R^2$ | 0.9951 |
|  | $R_L$ | 0.006 |
|  | $Q_m$ (mg g$^1$) | 270.27 |
| Freundlich isotherm | $R^2$ | 0.9929 |
|  | $K_F$ | 224.69 |
|  | n | 2 |
| Temkin isotherm | $R^2$ | 0.9919 |
|  | α | 54.16 |
|  | β | 70.29 |

The presented results indicate that the experimental data is strongly fitted to Langmuir isotherm model owing to its higher $R^2$ value, indicating monolayer adsorbent coverage which verifies that only one MG dye molecule occupied only one active site on the Fe—Co adsorbent surface (monolayer sorption phenomenon) and the interactions between adsorbed molecules were negligible. The value $R_L$ for the present study was calculated as 0.006, revealing favorability of the process. Using linear plot of Langmuir isotherm model, the slope was calculated to obtain maximum adsorption capacity of 270.27 mg g$^{-1}$.

Example 11: Adsorption Kinetics

To understand the adsorption mechanism of MG dye onto Fe—Co nanospheres in relation to time, the rate uptake of MG dye molecules onto the adsorbent surface was investigated through two kinetic models viz. pseudo first-order kinetics and pseudo second-order kinetics.

Figure 6B:
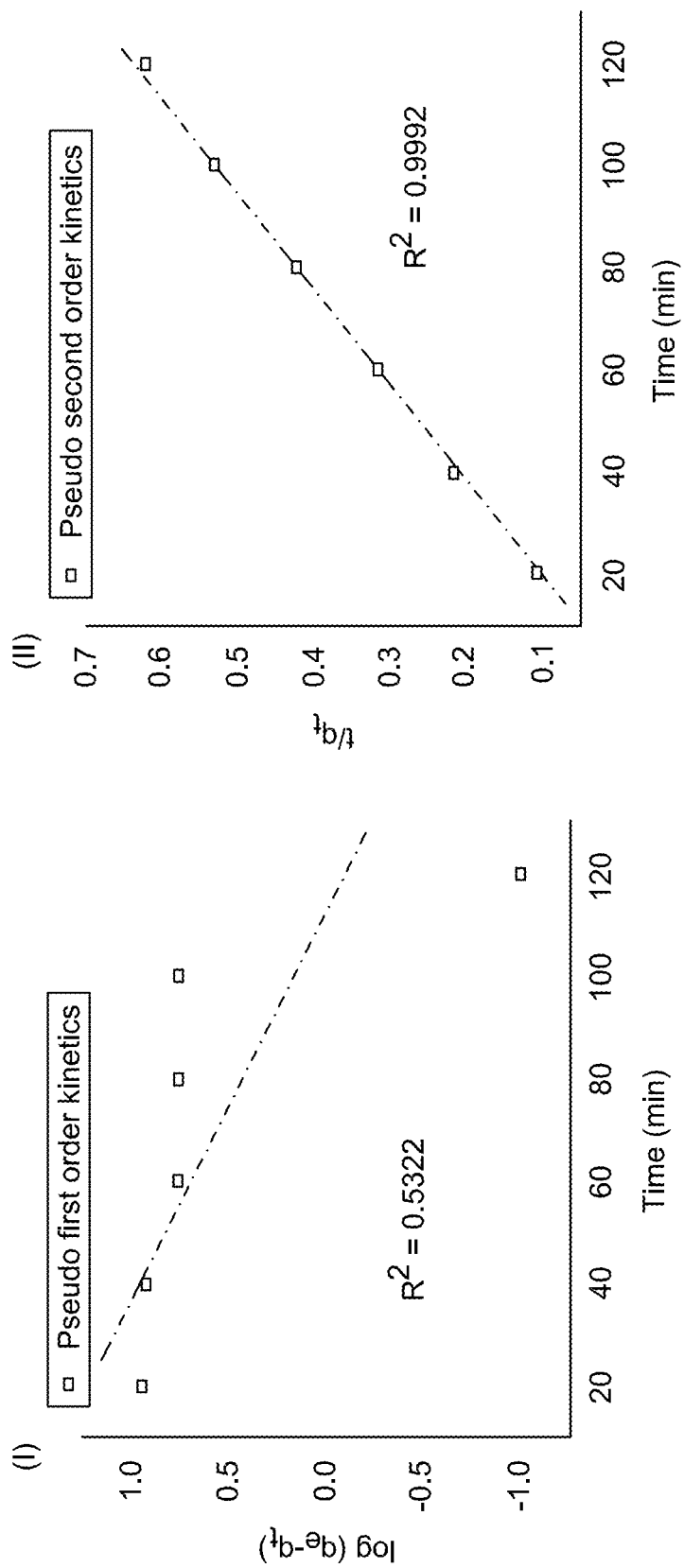
FIG. 6B shows plots of (I) Pseudo first-order kinetics model and (II) Pseudo second-order kinetics model for MG dye adsorption onto Fe—Co core-shell nanospheres, according to certain embodiments.

Referring to FIG. 6B, plots of (I) Pseudo first-order kinetic model and (II) Pseudo second-order kinetics model, for MG dye adsorption onto Fe—Co core-shell nanospheres are shown. Various kinetic parameters calculated from the plots depicted in FIG. 6B are given in Table 2.

TABLE 2

Parameters of kinetic models for adsorption of MG dye

| Kinetic model | Parameter | Value |
|---|---|---|
| Pseudo first-order kinetic model | $R^2$ | 0.5322 |
| | $k_1$ (1/min) | 0.033 |
| | $q_e$ (mg g$^{-1}$) | 4.75 |
| Pseudo second-order kinetic model | $R^2$ | 0.9997 |
| | $k_2$ (1/min) | 0.00297 |
| | $q_e$ (mg g$^{-1}$) | 192 |

The validity of applied models was analyzed by comparing the values of coefficient of determination ($R^2$) for both models which revealed pseudo second-order kinetics presented much better relation to adsorption phenomenon with R 2 value of 0.9992. This shows that the sorption of MG dye molecules onto Fe—Co core-shell nanospheres is chemical in nature.

Example 12: Adsorption Thermodynamics

To assess exothermic/endothermic nature, randomness, spontaneity and feasibility of the adsorption process, thermodynamic studies were conducted at different temperatures such as 283 K, 293 K, 303 K, and 313 K.

Figure 6C:
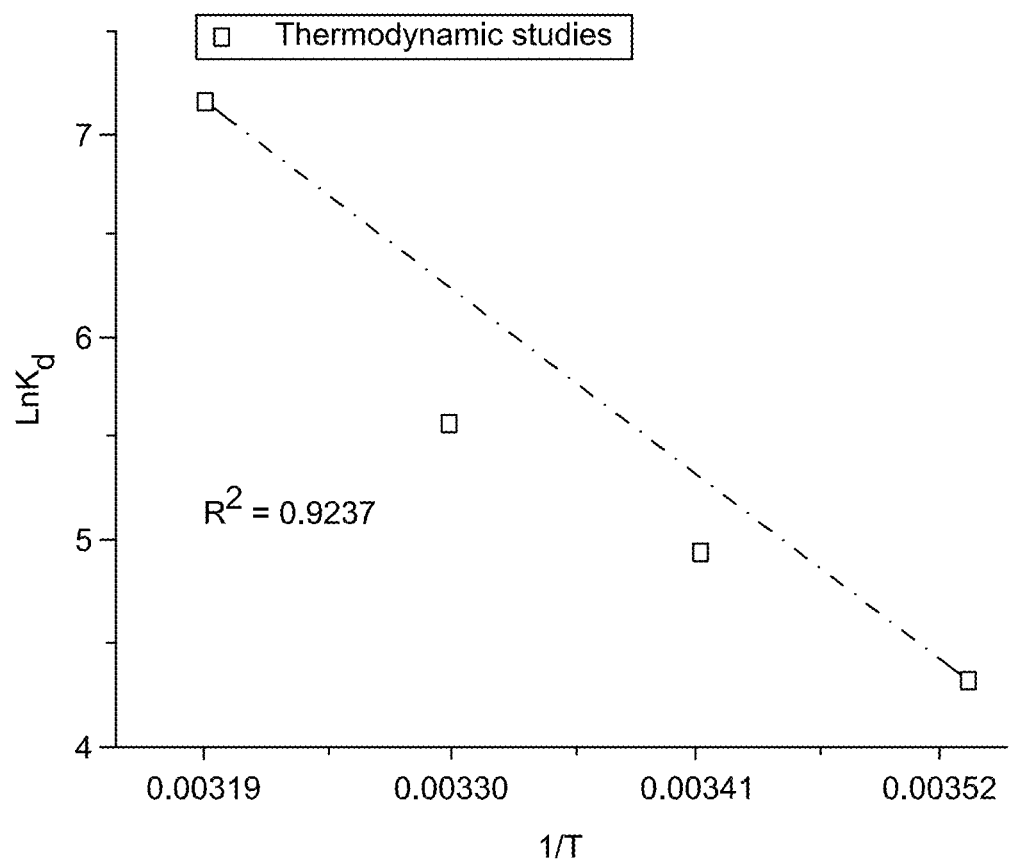
FIG. 6C shows Van't Hoff plot for MG dye adsorption onto Fe—Co core-shell nanospheres, according to certain embodiments.

Referring to FIG. 6C, Van't Hoff plot for MG dye adsorption onto Fe—Co core-shell nanospheres is shown. Various thermodynamic functions such as enthalpy ($\Delta H$), Entropy ($\Delta S$) and Gibb's free energy ($\Delta G$) were determined and are presented in Table 3.

TABLE 3

Thermodynamic parameters for adsorption of MG dye

| Temperature (K) | $\Delta G$ (KJ mol$^{-1}$) | $\Delta H$ (KJ mol$^{-1}$) | $\Delta S$ (J k$^{-1}$mol$^{-1}$) |
|---|---|---|---|
| 283 | −10.16 | 66.77 | 270.09 |
| 293 | −12.03 | | |
| 303 | −14.02 | | |
| 313 | −18.61 | | |

It can be observed from Table 3, that the negative values of free energy ($\Delta G$) throughout the entire temperature range indicate the feasibility as well as spontaneous nature of the adsorption process. Moreover, the gradual increase in $\Delta G$ values (−10.16 KJmol$^{-1}$ to −18.61 KJmol$^{-1}$) with increase in temperature shows that the process is favorable at elevated temperatures. The nature of adsorption phenomenon can be suggested as endothermic process as the value of enthalpy ($\Delta H$) was found to be positive. Positive value of entropy ($\Delta S$) exhibited by adsorbent, shows increased randomness at the solid-solute interface during the adsorption phenomenon.

Example 13: Adsorption Interaction Type

Figure 7:
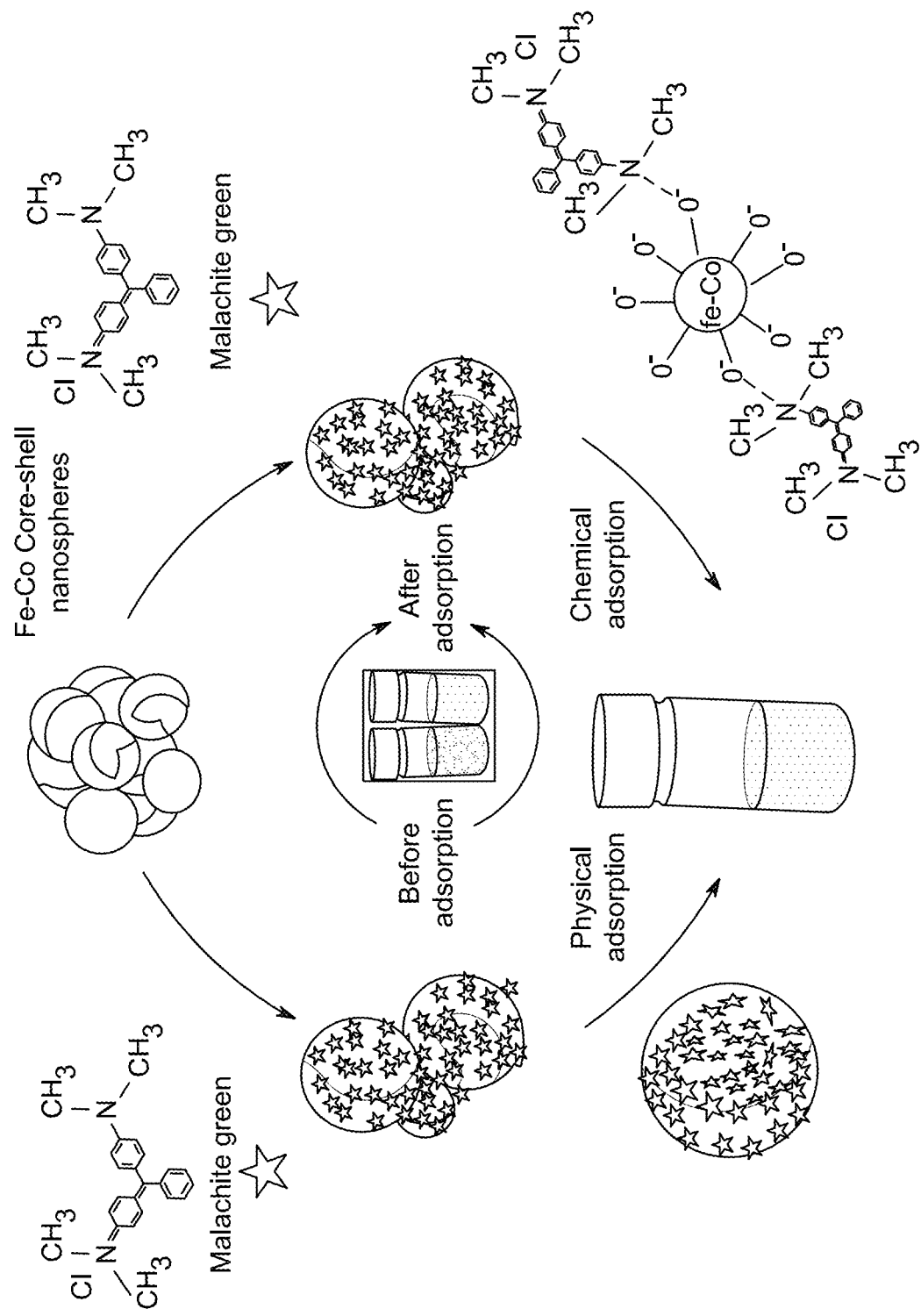
FIG. 7 shows an illustration of adsorption of MG dye onto Fe—Co core-shell nanospheres, according to certain embodiments.

Referring to FIG. 7, a photographic illustration of adsorption of MG dye onto Fe—Co core-shell nanospheres is depicted. As depicted in FIG. 7, MG molecules get physically adsorbed onto the surface of nanospheres as well as get trapped inside the hollow spheres, which indicates that the adsorbent material provides abundant sorption sites for the dye molecules, hence resulting in improved adsorption efficiency. Moreover, the possible chemical link between Fe—Co nanospheres and MG dye molecules is also depicted by the chemical bonding of cationic MG molecules onto the anionic Fe—Co adsorbent surface. Such strong chemical interactions between the dye molecules and the active sites on the adsorbent surface improve the sorption ability of MG dye molecules.

Example 14: Adsorption/Desorption Cycling

Figure 8:
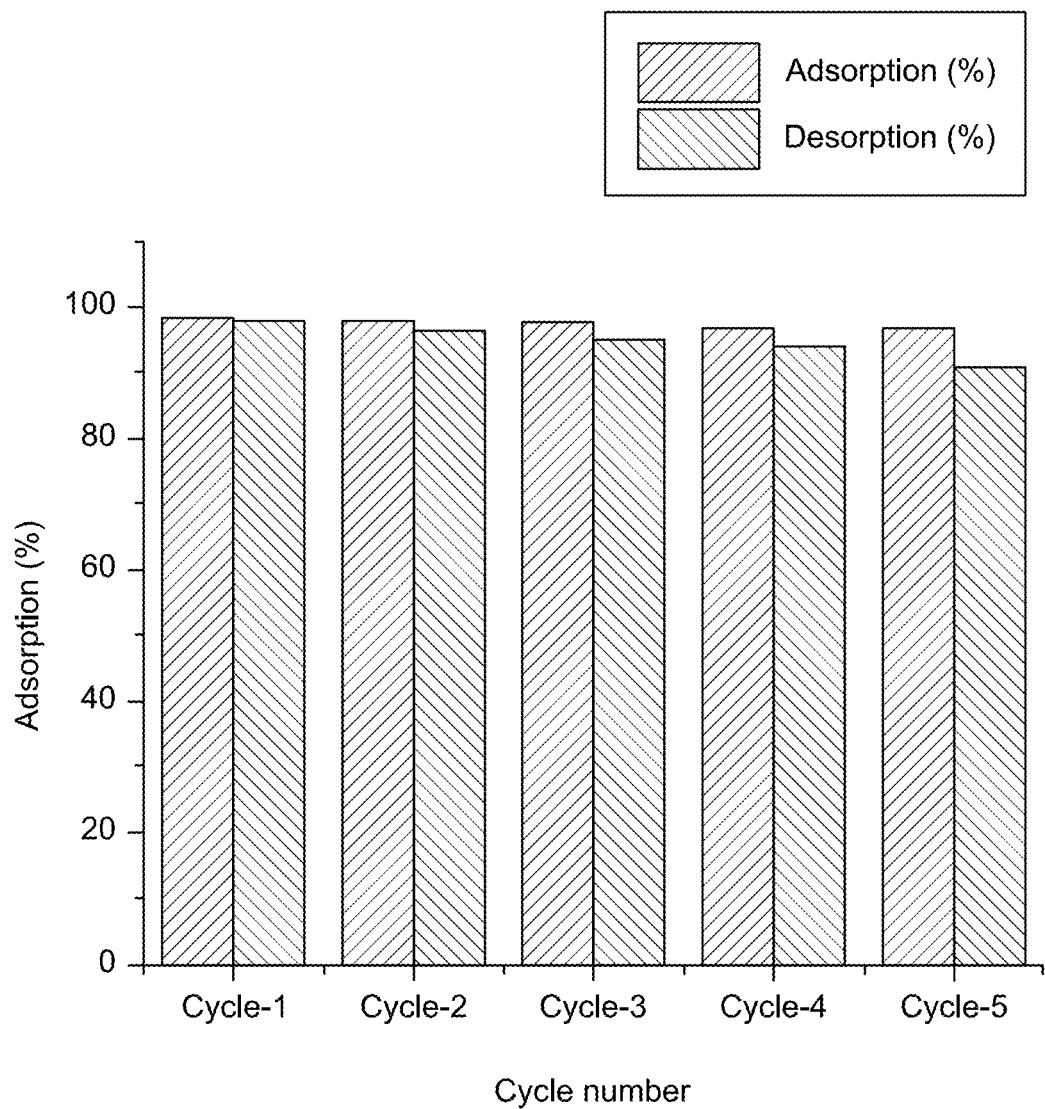
FIG. 8 shows efficiency of a regenerated Fe—Co core-shell nanosphere adsorbent across five consecutive cycles, according to certain embodiments.

Referring to FIG. 8, efficiency of a regenerated Fe—Co core-shell nanosphere adsorbent across five consecutive cycles is depicted. 50 ppm MG dye solution was mixed with the Fe—Co nanospheres, and solution was stirred for 1 hour. To regenerate the adsorbent material, 0.1M HCl solution was used as desorbing agent and the solution was stirred for 1 hour. The desorption percentage of MG dye molecules was evaluated by using UV-VIS spectrophotometer at $\lambda_{max}$ 617 nm.

As seen from FIG. 8, the desorption efficiency of the adsorbent was quite stable and remained at >90% in all five cycles, which indicates excellent regeneration efficiency of adsorbent. Furthermore, the adsorption efficiency of Fe—Co nanospheres was sustained throughout five cycles with a slight drop in removal efficiency from 98.5% to 96.8%, which shows that the adsorbent can be utilized successively for the MG dye removal from water, without any insignificant loss in functionality.

Example 15: Membrane Fabrication

Pure PVDF and nanocomposite PVDF membranes were synthesized using immersion precipitation technique. For the synthesis of pure PVDF membrane, 17 wt. % PVDF was gradually added to the NMP solution, and the mixture was stirred for 24 hours at 60° C., to obtain a homogenous dope solution.

Nanocomposite membranes comprising 0.05 wt. %, 0.1 wt. %, and 0.2 wt. % Fe—Co nanospheres were prepared by adding the nanospheres into NMP solutions and dispersing them using ultrasound probe device for at least 5 minutes to obtain suspensions. PVDF was slowly added to the suspensions and the solutions were continuously stirred for 24 hours at 60° C., to get homogenous solutions.

For degassing, all solutions were further placed in oven at 50° C. for 6 hours. After degassing, the doped solutions were cast on a uniform glass plate with 150 μm thickness. The cast films were immediately dipped in a water bath filled with deionized water, at 30° C., and finally, the films were placed in fresh deionized water for 24 hours, to leach out any remaining entrapped solvent. The composition of pure and nanocomposite membranes is presented in Table 4 below.

TABLE 4

Composition of synthesized pure PVDF and nanocomposite membranes

| Sr. No. | Membrane name | Membrane code | PVDF (Wt. %) | NMP (Wt. %) | Fe—Co core-shell nanospheres (Wt. %) |
|---|---|---|---|---|---|
| 1 | Pure PVDF | M-0 | 17 | 83 | 0 |
| 2 | PVDF/Fe—Co (0.05%) | M-0.05 | 17 | 82.95 | 0.05 |
| 3 | PVDF/Fe—Co (0.1%) | M-0.1 | 17 | 82.9 | 0.1 |
| 4 | PVDF/Fe—Co (0.2%) | M-0.2 | 17 | 82.8 | 0.2 |

Membrane Characterization

Example 16: Structure and Morphology Analysis

SEM micrographs, TEM micrographs, and EDAX were employed to investigate the morphology, size, and structure of the membranes fabricated. The surface morphology of the membranes was studied through scanning electron microscopy (SEM). The detailed morphology and structure of the membranes was studied by transmission electron microscopy (TEM). Energy dispersive X-rays (EDX) spectroscopy (EDAX) was performed to examine elemental composition of the membranes.

Figure 9A:
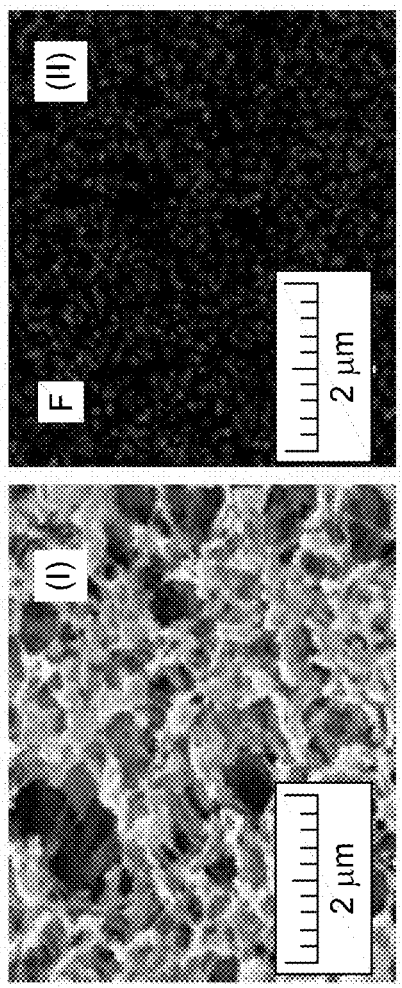
FIG. 9A shows (I) SEM image and (II) important elemental mapping of a pure PVDF M-0 membrane before membrane filtration, according to certain embodiments.
Figure 9B:
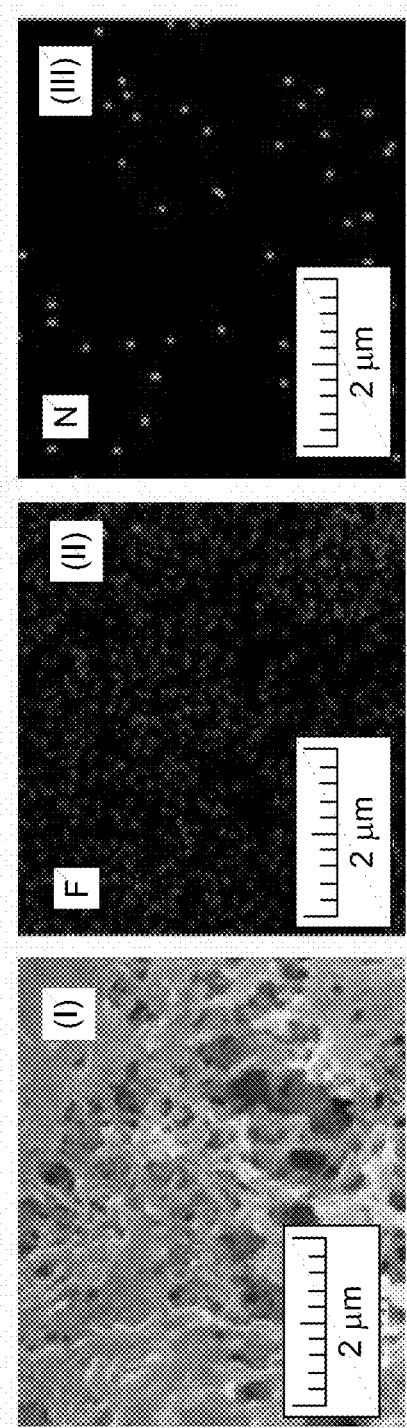
FIG. 9B shows (I) SEM image and (II-III) important elemental mapping of a pure PVDF M-0 membrane after membrane filtration, according to certain embodiments.

Referring to FIG. 9A, (I) SEM image and (II) important elemental mapping of a pure PVDF M-0 membrane before membrane filtration is shown. Referring to FIG. 9B, (I) SEM image and (II-III) important elemental mapping of the pure PVDF M-0 membrane after membrane filtration is shown.

As seen in FIG. 9A(I), the M-0 membrane morphology has a high number of pores of large size. As seen in FIG. 9B(I), these pores became smaller after filtration.

Further, as seen in FIG. 9A(II), fluorine is distributed in the membrane structure. As shown in FIG. 9B(II) and FIG. 9B(III), fluorine and nitrogen are present in the membrane after filtration.

Figure 10A:
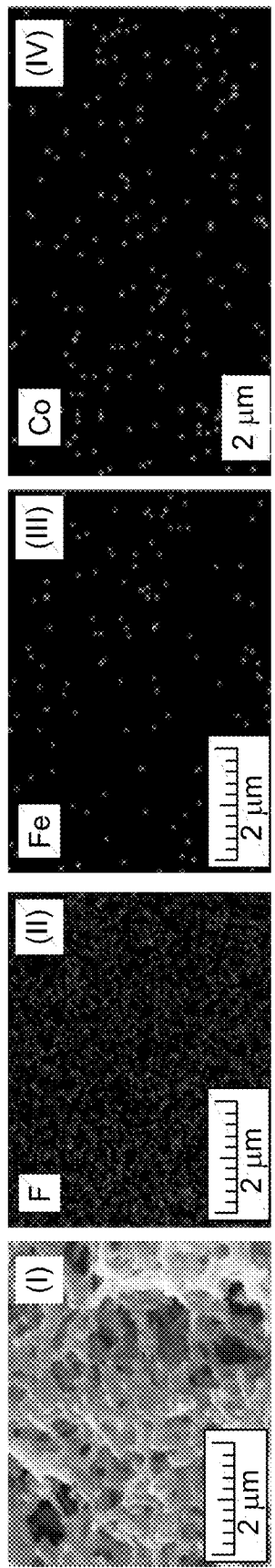
FIG. 10A shows (I) SEM image and (II-IV) important elemental mapping of a nanocomposite M-0.1 membrane before membrane filtration, according to certain embodiments.
Figure 10B:
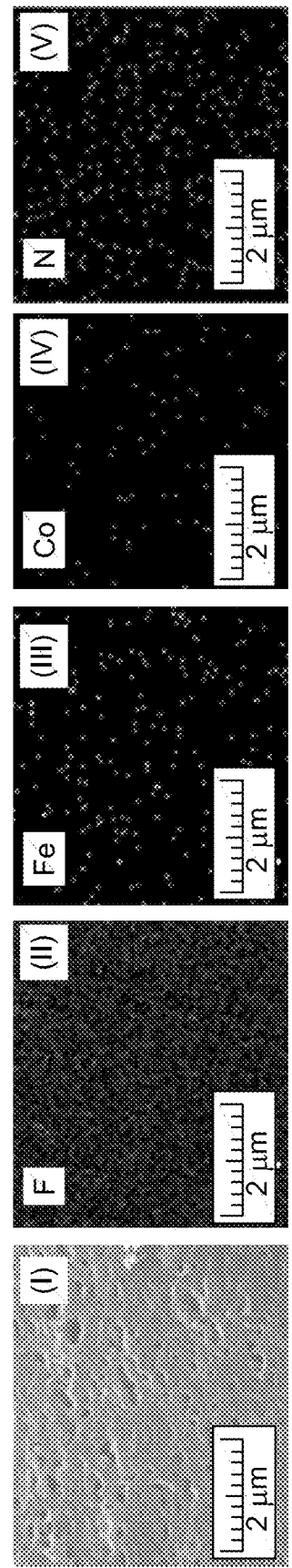
FIG. 10B shows (I) SEM image and (II-V) important elemental mapping of a nanocomposite M-0.1 membrane after membrane filtration, according to certain embodiments.

Now referring to FIG. 10A, (I) SEM image and (II-IV) important elemental mapping of a nanocomposite M-0.1 membrane before membrane filtration is shown. Referring to FIG. 10B, (I) SEM image and (II-V) important elemental mapping of the nanocomposite M-0.1 membrane after membrane filtration is shown.

As seen in FIG. 10A(I), comparatively smaller pores are observed, especially after filtration as shown in FIG. 10B(I), indicating high performance of membrane adsorption of MG. Further, the elemental mapping of the nanocomposite M-0.1 membrane before membrane filtration shown in FIG. 10A(II), FIG. 10A(III), and FIG. 10A(IV) shows fluorine, iron, and cobalt distributed in the membrane structure. In addition to fluorine, iron, and cobalt, as seen in FIG. 10B(II), FIG. 10B(III), FIG. 10B(IV), and FIG. 10B(V), nitrogen is also seen after filtration.

Example 17: Fourier-Transform Infrared (FTIR) Spectroscopy

The internal chemical structure of the pure PVDF M-0 membrane and nanocomposite membranes was investigated by Fourier Transform Infrared (FTIR) spectroscopy within the range 4000-400 cm$^{-1}$ at a resolution of 4 cm$^{-1}$.

Figure 11:
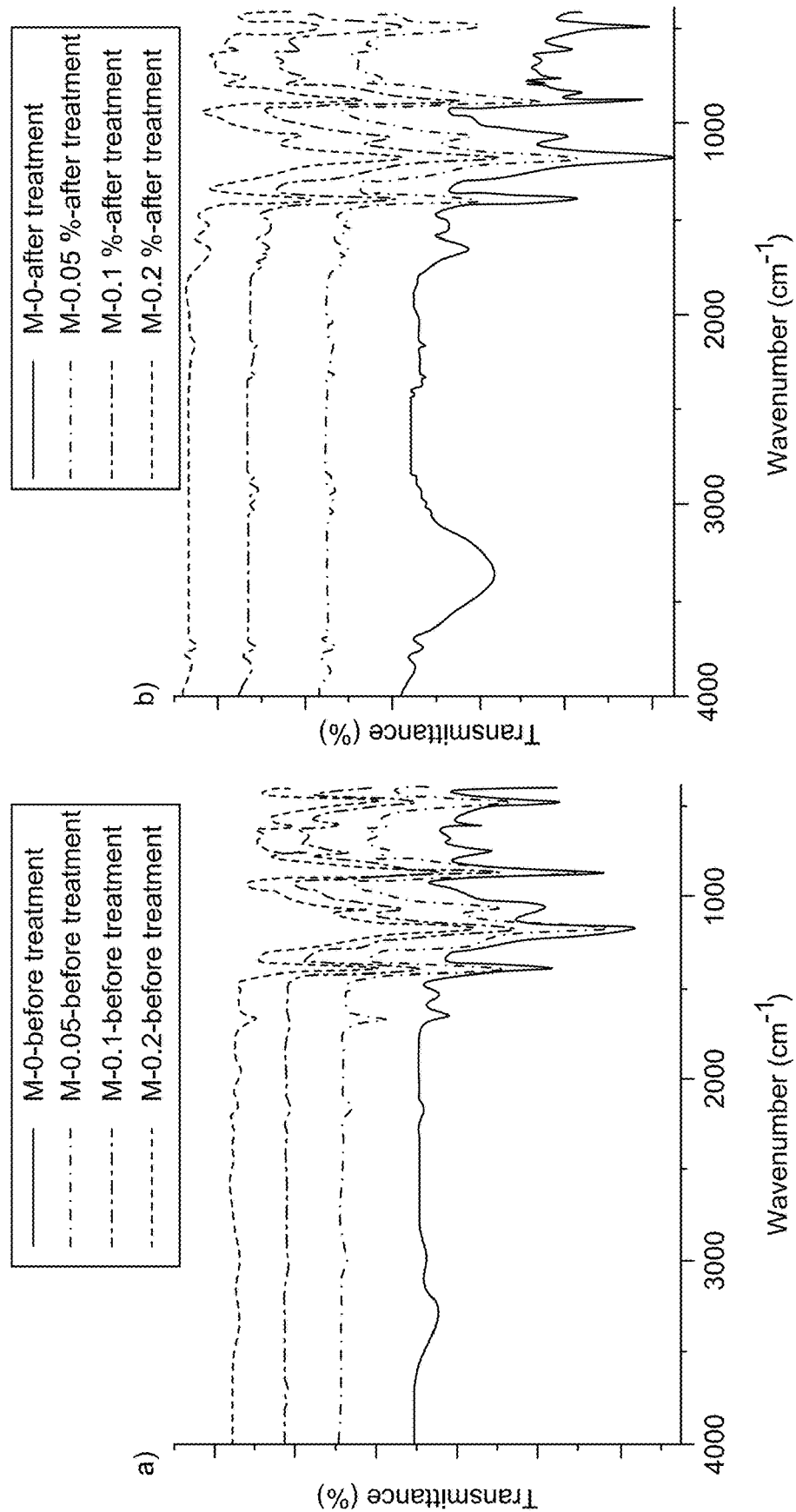
FIG. 11 shows FTIR spectra of a pure PVDF M-0 membrane and nanocomposite (M-0.05, M-0.1, and M-0.2) membranes (a) before filtration and (b) after filtration, according to certain embodiments.

Referring to FIG. 11, FTIR spectra of pure PVDF M-0 membrane and nanocomposite (M-0.05, M-0.1, and M-0.2) membranes (a) before filtration and (b) after filtration are shown. Before treatment, as seen in FIG. 11(a), the absorption peaks at 3282 and 2950 cm$^{-1}$ indicated $CH_2$ asymmetric and symmetric vibrations of pure PVDF. As seen in FIG. 11(b), the peak of asymmetric vibrations increased markedly after treatment, while the peaks of symmetric vibrations disappeared in nanocomposite membranes. The weak band at 1646 cm$^{-1}$ of PVDF is assigned to the C═O stretching vibration mode, which reduced after treatment. The strong peaks at 1407, 1182, 875 and 832 cm$^{-1}$ are due to C—F stretching vibrations, C—C band, C—H, and C—F bending of PVDF, respectively.

Example 18: Thermal Gravimetric Analysis

Figure 12:
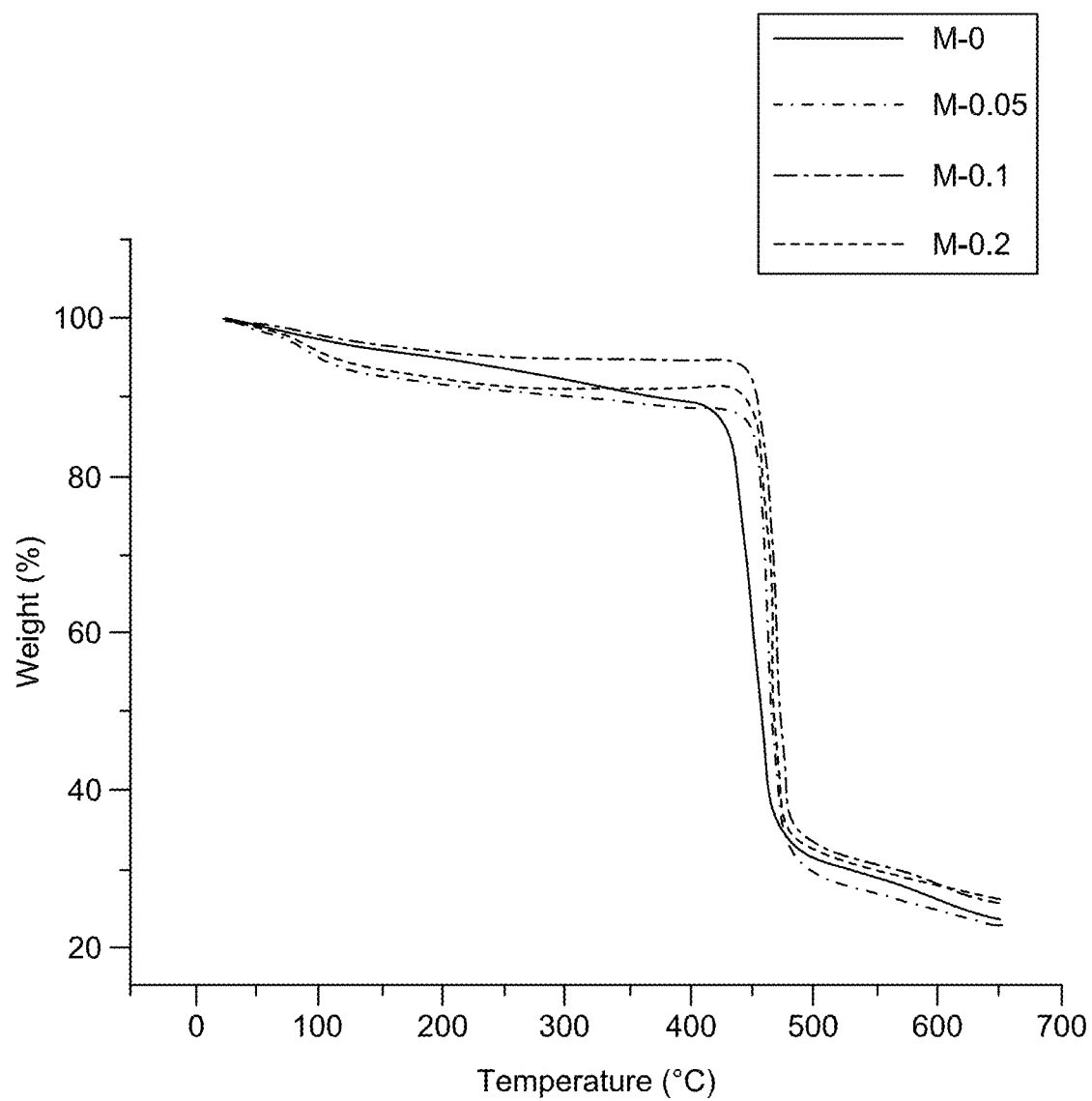
FIG. 12 shows TGA plot of a pure PVDF M-0 membrane and nanocomposite (M-0.05, M-0.1, and M-0.2) membranes, according to certain embodiments.

Thermal gravimetric analysis (TGA) was applied to check the thermal stability and weight loss of membranes using PerkinElmer Pyris™ 1 TG Analyzer. Referring to FIG. 12, TGA plot of pure PVDF M-0 membrane and nanocomposite (M-0.05, M-0.1, and M-0.2) membranes is depicted.

As seen in FIG. 12, all membranes showed high stability up to 450° C. After that, the thermal degradation started and occurred in two major weight-loss stages. The first stage, corresponding to degradation of PVDF, occurs within a temperature range of 450-500° C., and the main weight of polymer matrix was lost by approximately 60%. The second degradation stage occurs in the range of 500-650° C. and shows as a slight slope variation compared to the first stage.

Example 19: Membrane Performance Investigation

Membrane filtration studies were conducted using a lab-scale cross flow filtration unit including a feed tank, a pressure gauge, a pump, a flow meter, a filter holder, and permeate tank, wherein all the said components connected in series, in the order specified. The feed water was added into a 1 L reservoir and pumped to the 4.9 cm$^2$ of the membrane surface area. The pressure was applied by a vacuum pump. To obtain constant pure water flux (PWF), all membranes were pre-compacted for 30 minutes under 0.1 bar pressure. All performance experiments were conducted at least two times and then average values were reported.

Example 20: Dye Rejection Efficiency

Figure 13:
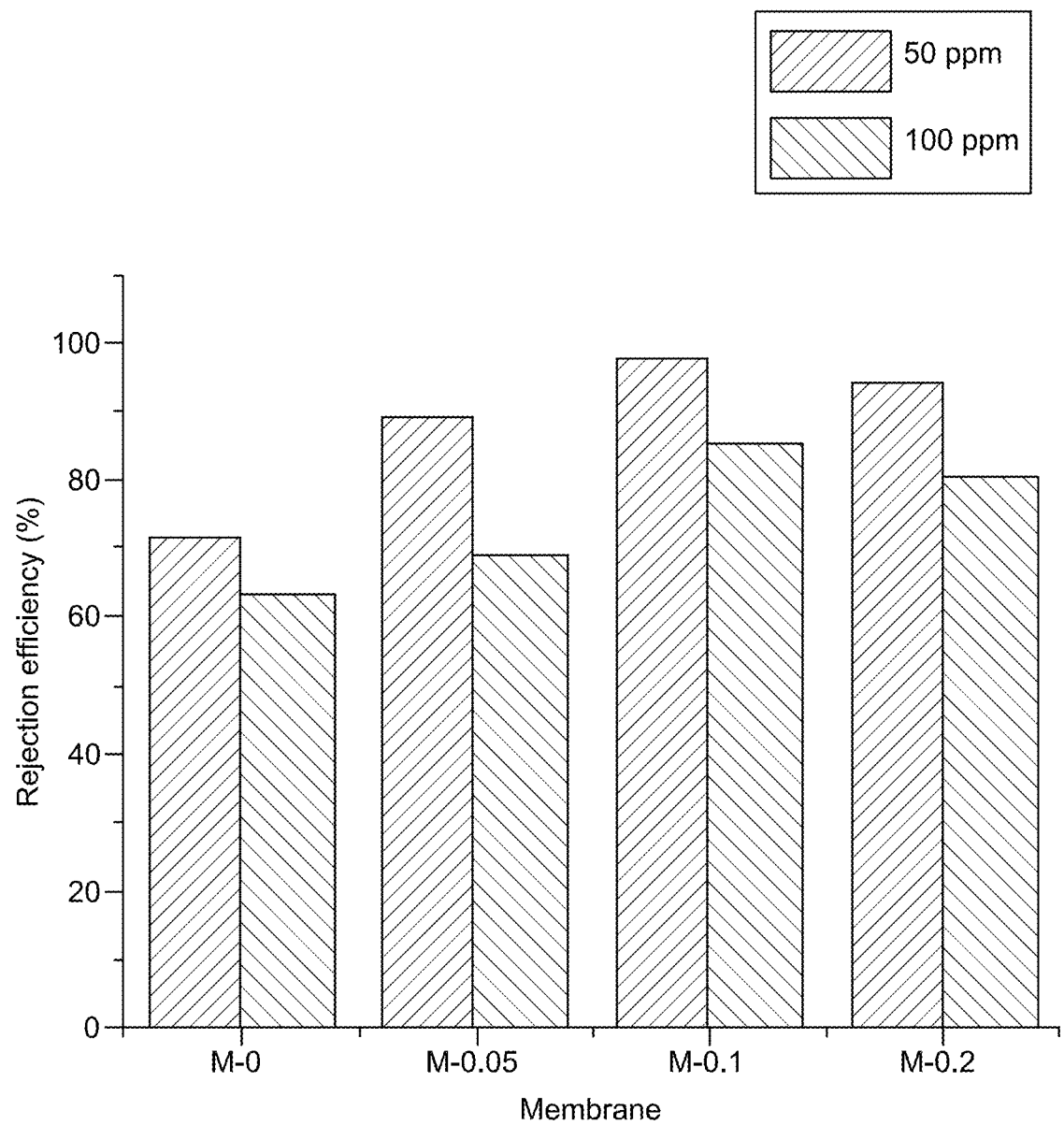
FIG. 13 shows dye rejection efficiency of a pure PVDF M-0 membrane and nanocomposite (M-0.05, M-0.1, and M-0.2) membranes, using different concentrations of MG dye (50 ppm and 100 ppm), according to certain embodiments.

Referring to FIG. 13, dye rejection efficiency of pure PVDF M-0 membrane and nanocomposite (M-0.05, M-0.1, and M-0.2) membranes, using different concentrations of MG dye (50 ppm and 100 ppm) is shown. The rejection efficiency was analyzed at a pressure of 0.05 bar with the feed solution at temperature of 25° C.

As seen in FIG. 13, with increase in the concentration of nanospheres inside the membranes, the percentage dye removal efficiency increased. At 50 ppm of MG dye concentration, the dye removal efficiency significantly improved from 71.6% by the M-0 membrane to 97% by the M-0.1 membrane. This could be due to the enhanced porosity of nanocomposite membranes with increase in the Fe—Co nanosphere quantity which improved the accessibility of the adsorption sites on the membrane surface for MG dye molecules. However, further increasing the amount of Fe—Co nanospheres inside the membrane matrix (M-0.2) resulted in declined rejection rate of 94% which might be due to the appearance of uneven macropores on the membrane surface, thus allowing MG dye molecules to pass through the membrane. Thus, maximum dye removal was achieved with the M-0.1 membrane using 50 ppm dye concentration as a feed solution. At 100 ppm dye concentration, the rejection efficiency of all membranes decreased due to the existence of mass transfer driving force of dye molecules, as with the increased dye concentration, the driving force of dye to pass through the membrane also enhanced which reduced the separation performance of membrane.

Figure 14:
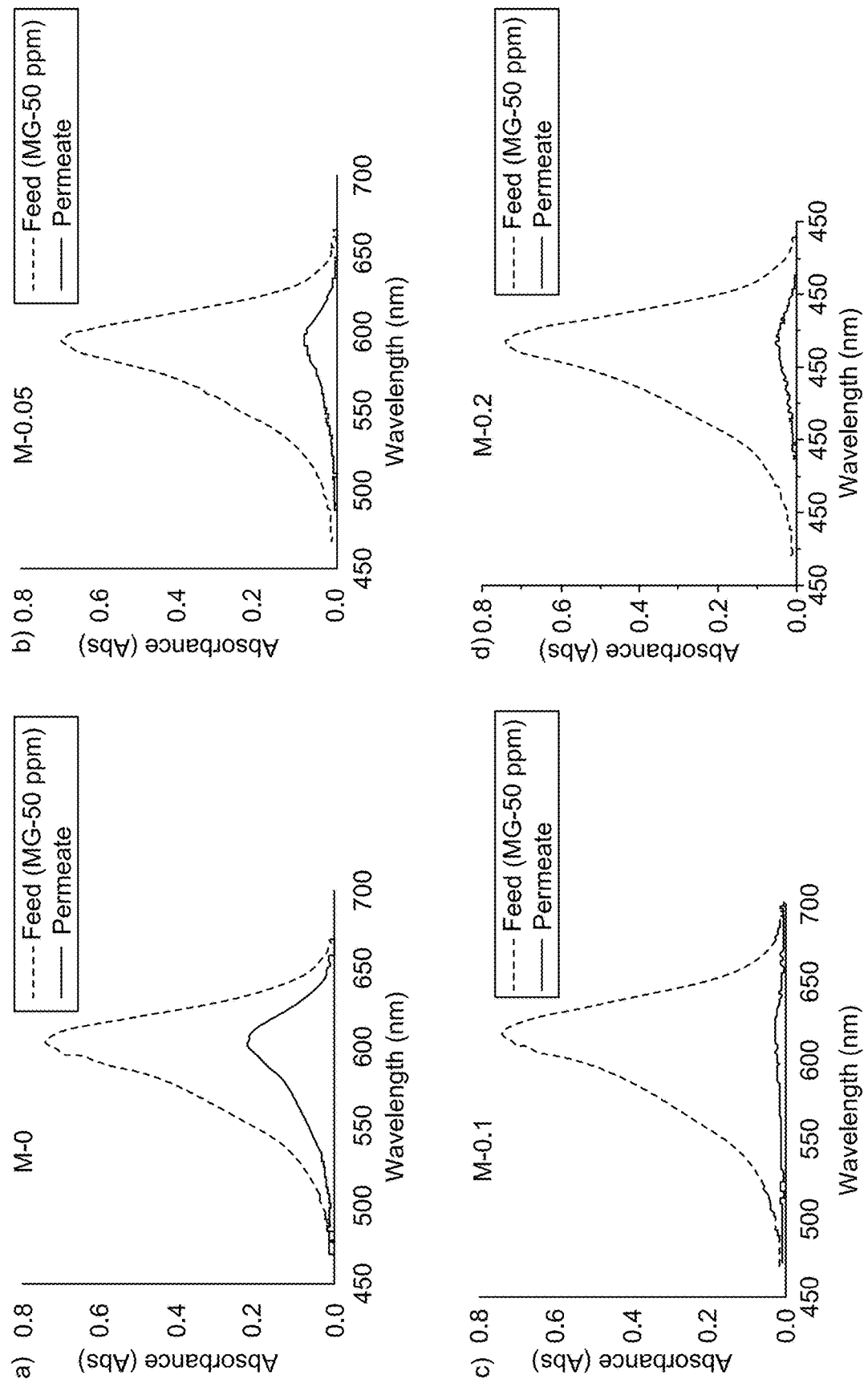
FIG. 14 shows absorbance spectra of a 50 ppm MG dye feed solution and a permeate after membrane filtration by a) pure PVDF M-0 membrane, b) nanocomposite M-0.05 membrane, c) nanocomposite M-0.1 membrane, and d) nanocomposite M-0.2 membrane, according to certain embodiments.

Now referring to FIG. 14, absorbance spectra of a 50 ppm MG dye feed solution and a permeate after membrane filtration by a) pure PVDF M-0 membrane, b) nanocomposite M-0.05 membrane, c) nanocomposite M-0.1 membrane, and d) nanocomposite M-0.2 membrane, is shown.

As seen in FIG. 14($c$), minimum absorbance occurred for permeate from M-0.1 membrane, indicating maximum dye removal of 97%. Also, the removal efficiency declined for M-0.2 membrane.

Example 21: Pure Water Flux (PWF) and Water Contact Angle

Surface hydrophilicity of the membranes was investigated by contact angle value using a contact angle meter (Biolin Scientific Attention Theta Flex).

Figure 15A:
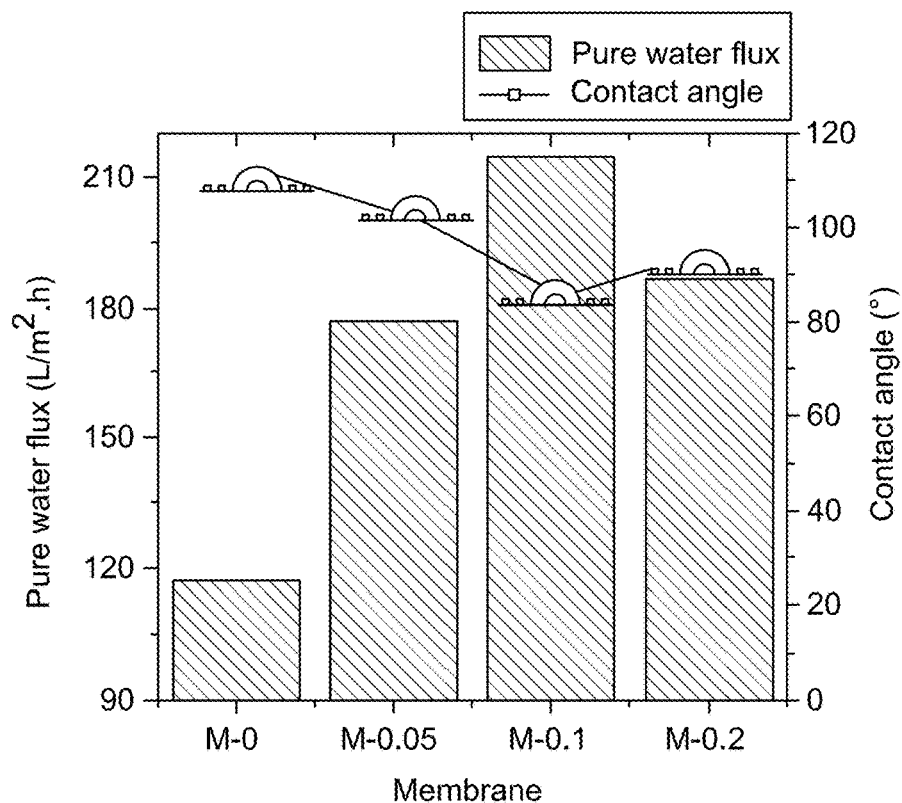
FIG. 15A shows plot of pure water flux (PWF) and water contact angle for pure PVDF M-0 membrane and nanocomposite (M-0.05, M-0.1, and M-0.2) membranes at 0.05 bar, according to certain embodiments.

Referring to FIG. 15A, plot of pure water flux (PWF) and water contact angle for pure PVDF M-0 membrane and nanocomposite (M-0.05, M-0.1, and M-0.2) membranes at 0.05 bar is shown.

As seen in FIG. 15A, the water contact angle values decreased from 110.43° for M-0 membrane to 86.99° for M-0.1 membrane, which shows improved hydrophilicity of the membranes. Improved hydrophilicity due to increased nanocomposite content in membranes assisted water molecules to pass through the membranes, readily, which enhanced PWF of the membranes from 116.84 L/m² h for M-0 to 214.73 L/m² h for M-0.1. For M-0.2, the water contact angle increased to 92.9° which resulted in decline in water flux to 186.31 L/m² h. This could be due to enhanced viscosity of membrane casting solution which could not reduce the solvent-solute exchange process during phase inversion, leading to the slow movement of Fe—Co nanospheres to the membrane surface, resulting in increased contact angle. Apart from this reason, agglomeration of Fe—Co nanospheres inside the membrane matrix also could have enhanced hydrophobicity of the M-0.2 membrane, leading to decline in water flux.

Example 22: Pure Water Flux (PWF) and Dye Water Flux

Figure 15B:
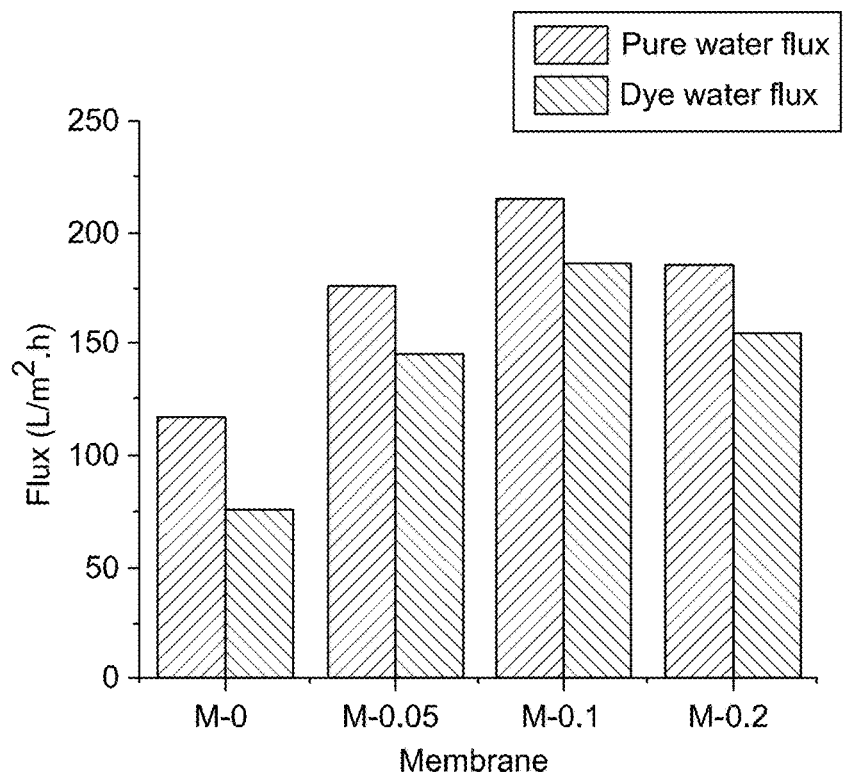
FIG. 15B shows plot of pure water flux (PWF) and dye water flux of 50 ppm MG dye feed solution through pure PVDF M-0 membrane and nanocomposite (M-0.05, M-0.1, and M-0.2) membranes at 0.05 bar, according to certain embodiments.

Referring to FIG. 15B, plot of pure water flux (PWF) and dye water flux of 50 ppm MG dye feed solution through pure PVDF M-0 membrane and nanocomposite (M-0.05, M-0.1, and M-0.2) membranes at 0.05 bar is shown.

As seen in FIG. 15B, the dry water flux increased from M-0 membrane to M-0.1 membrane and then declined for M-0.2 membrane. PWF of the membranes increased from 116.84 L/m² h for M-0 to 214.73 L/m² h for M-0.1 and got reduced to 186.31 L/m² h for M-0.2. Further it was observed that the difference between PWF and dye water flux got reduced from M-0 membrane to M-0.1 membrane which could be attributed to the addition of hydrophilic nanospheres in the nanocomposite membranes.

Figure 15C:
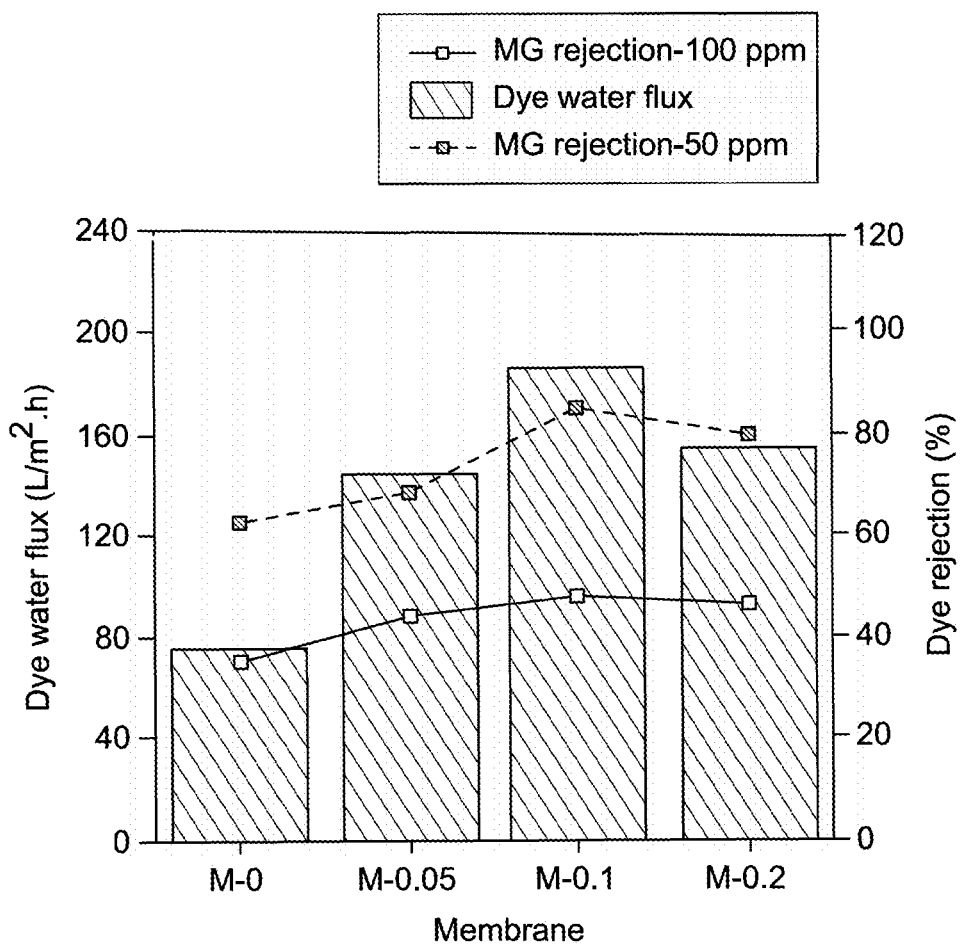
FIG. 15C shows plot of percentage dye removal and dye water flux of 50 ppm and 100 ppm MG dye feed solutions through pure PVDF M-0 membrane and nanocomposite (M-0.05, M-0.1, and M-0.2) membranes at 0.05 bar, according to certain embodiments.

Referring to FIG. 15C, plot of percentage dye removal and dye water flux of 50 ppm and 100 ppm MG dye feed solutions through pure PVDF M-0 membrane and nanocomposite (M-0.05, M-0.1, and M-0.2) membranes at 0.05 bar is shown.

As seen in FIG. 15C, the percentage of MG dye rejection obtained with 50 ppm MG dye concentration for M-0.1 membrane was higher than the percentage of MG dye rejection obtained with 100 ppm MG dye concentration for M-0.1 membrane. Moreover, the dye water flux was also found to be superior for M-0.1 membrane (186.31 L/m² h), compared to other membranes.

Example 23: Membrane Fouling Resistance

Membrane fouling may be caused by the rejected dye molecules getting accumulated on the membrane surface or their entrapment inside the membrane pores, leading to reduced water flux, disruption in membrane performance and reduction in membrane lifetime. Membrane anti-fouling performance was investigated by evaluating four indices viz. total fouling resistance, reversible fouling resistance, irreversible fouling resistance and the water flux recovery ratio (FRR).

To investigate the membrane fouling performance, membranes were washed with distilled water for at least 30 minutes, just after the completion of dye rejection experiments. The washed membranes were then immersed in distilled water for 1 hour. After 60 minutes, PWF was measured again and then membrane fouling resistances were calculated.

Figure 16A:
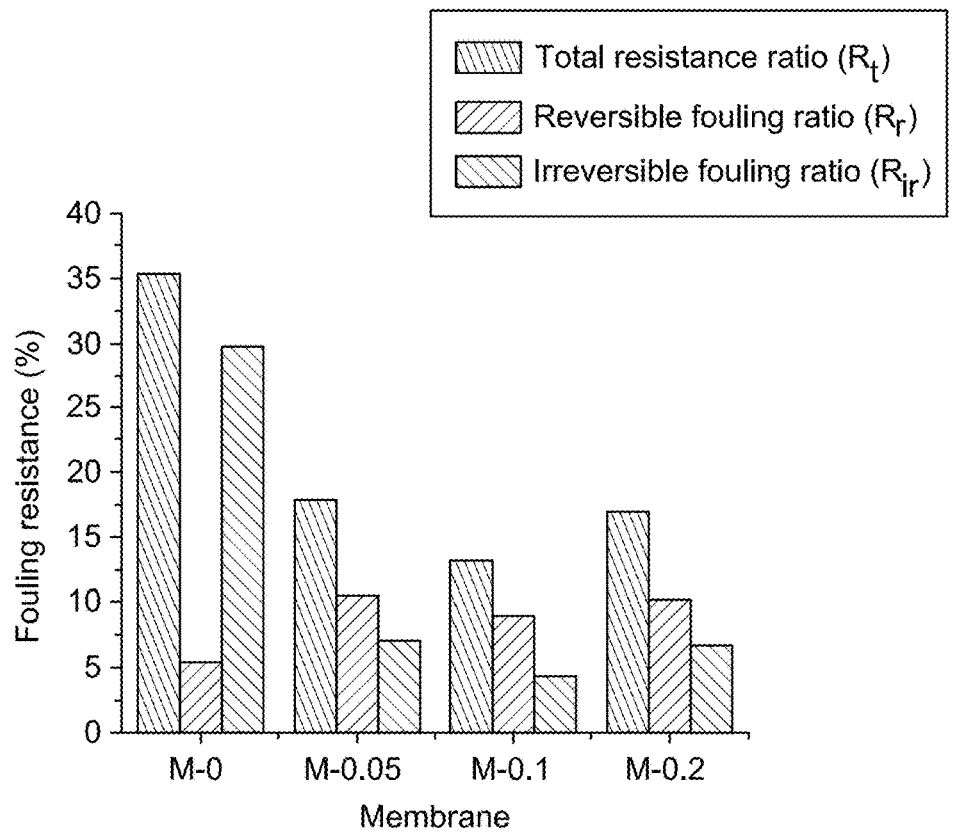
FIG. 16A shows fouling resistances (%) of pure PVDF M-0 membrane and nanocomposite (M-0.05, M-0.1, and M-0.2) membranes, according to certain embodiments.

Referring to FIG. 16A, fouling resistances (%) of pure PVDF M-0 membrane and nanocomposite (M-0.05, M-0.1, and M-0.2) membranes is shown. As seen from FIG. 16A, data for Total resistance ratio ($R_t$), Reversible fouling ratio ($R_r$) and Irreversible fouling ratio ($R_{ir}$) is presented. It can be observed that $R_t$ and $R_{ir}$ declined from 35.13% and 29.72% for M-0 to 13.2% and 4.41% for M-0.1, respectively. $R_r$ increased from 5.4% in M-0 membrane to 8.82% in M-0.1 membrane. Lower $R_{ir}$ and higher $R_r$ values for M-0.1 membrane indicates that a higher fraction of fouling can be reversed by washing the used membrane with distilled water, which is ascribed to more hydrophilic and smoother surface property of the membrane.

Figure 16B:
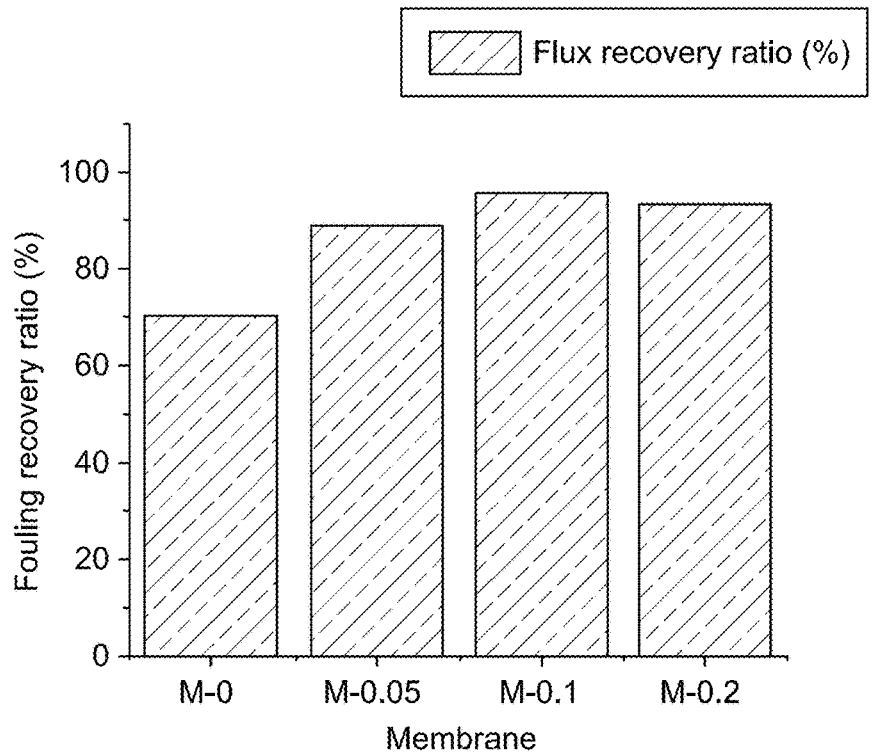
FIG. 16B shows water flux recovery ratio (%) of pure PVDF M-0 membrane and nanocomposite (M-0.05, M-0.1, and M-0.2) membranes, according to certain embodiments.

Referring to FIG. 16B, water flux recovery ratio (%) of pure PVDF M-0 membrane and nanocomposite (M-0.05, M-0.1, and M-0.2) membranes is shown. As seen from FIG. 16B, all nanocomposite membranes exhibited higher FRR values (around 90%) compared to unmodified pure PVDF M-0 membrane (around 70%). Further, FRR of the membranes increased from 70.3% for M-0 to 95.6% for M-0.1, demonstrating enhanced anti-fouling performance of the nanocomposite membranes. M-0.1 membrane demonstrated best anti-fouling performance, owing to its higher hydrophilicity, decreased the interfacial resistance which assisted in detachment of adsorbed foulants from the membrane surface by shear forces. A slight decline in FRR was observed for M-0.2 membrane which could be due to the reduced water contact angle and the formation of agglomerates of nanospheres leading severe pore blocking at higher nanocomposite content ratios, resulting in reduced repulsion between MG dye molecules and membrane surface.

Example 24: Membrane Stability

To evaluate the stability of the nanocomposite M-0.1 membrane in membrane filtration processes, long term filtration studies over 3 cycles were performed. After each cycle, the used membrane was washed with distilled water for 30 minutes. During first cycle with a long duration of 2 hours, dye permeance along with its rejection values were obtained. During second and third cycle of 2 hours duration, membrane reusability was assessed.

Figure 17:
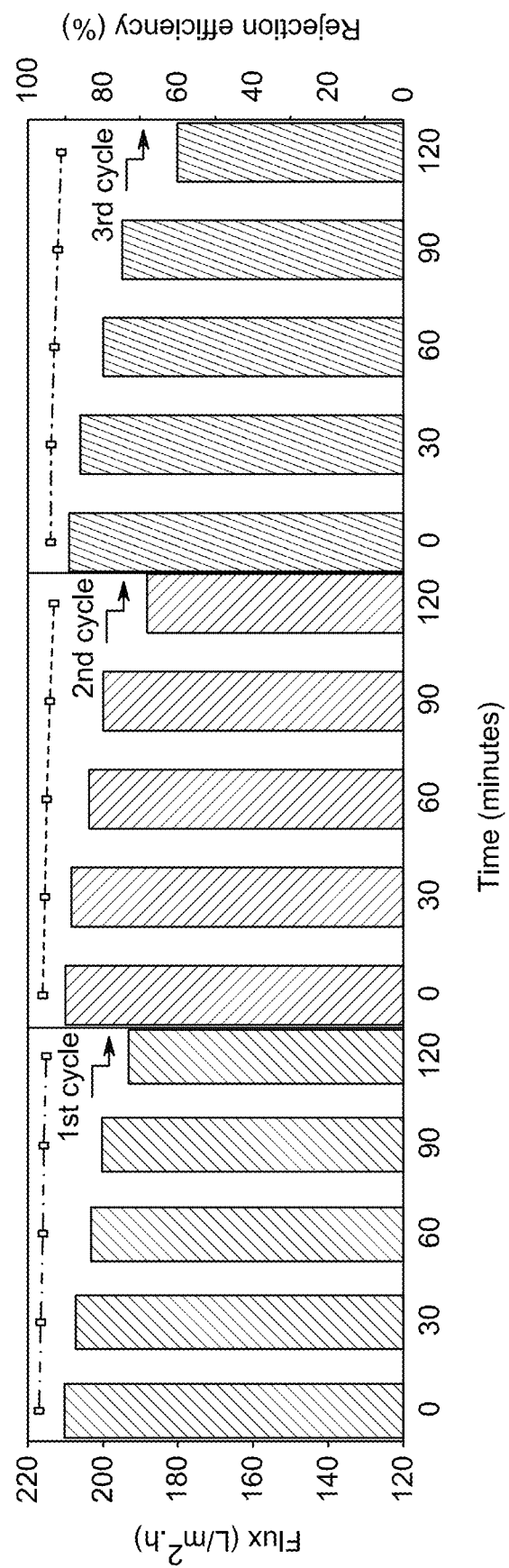
FIG. 17 shows long term dye rejection and permeance performance in a multi-cycle filtration experiment of MG dye removal through a nanocomposite M-0.1 membrane, according to certain embodiments.

Referring to FIG. 17, long term dye rejection and permeance performance in a multi-cycle filtration experiment of MG dye removal through the nanocomposite M-0.1 membrane is shown. As seen from FIG. 17, the dye permeance gradually decreased during the filtration of MG dye with the operational time of 2 hours, in each cycle, due to excessive aggregation of MG dye molecules onto the membrane surface pores. The flux recovery of membrane after each cycle showed only a slight decline (around 14%), i.e., from 210 L/m$^2$ h to 180 L/m$^2$ h. Further, the rejection of MG was quite steady throughout the cyclic process and only around 6% drop in dye rejection efficiency was observed after three filtration cycles, i.e., from 97% to 91%.

Numerous modifications and variations of the present disclosure are possible in light of the above teachings. It is therefore to be understood that within the scope of the appended claims, the invention may be practiced otherwise than as specifically described herein.

The invention claimed is:

1. A method of reducing an organic contaminant in a solution, the method comprising:
   contacting a membrane comprising a Fe—Co core-shell nanosphere with the solution having the organic contaminant,
   wherein the Fe—Co core-shell nanosphere comprises:
      a shell made of a material having a formula $Co_xFe_yO_{(x+1.5y)}$, wherein:
      x is in the range of 1 to 15; and
      y is in the range of 1 to 25;
      a hollow core;
      wherein the Fe—Co core-shell nanosphere has an average particle diameter of 1.5 to 10 µm, an average shell thickness of 50 to 300 nm and a crystallite size (D) of 15 to 30 nm,
      wherein the Fe—Co core-shell nanosphere has a single shell.

2. The method of claim 1, wherein the Fe—Co core-shell nanosphere, the formula $Co_xFe_yO_{(x+1.5y)}$:
   x is in the range of 1 to 5; and
   y is in the range of 1 to 10.

3. The method of claim 1, wherein the Fe—Co core-shell nanosphere the shell is made of $CoFe_2O_4$.

4. The method of claim 1, wherein the Fe—Co core-shell nanosphere the Fe—Co core-shell nanosphere has an average shell thickness of 50 to 100 nm.

5. The method of claim 1, wherein the Fe—Co core-shell nanosphere the Fe—Co core-shell nanosphere has a crystallite size (D) of 15 to 25 nm.

6. The method of claim 1, wherein the Fe—Co core-shell nanosphere the Fe—Co core-shell nanosphere has a peak at 500 to 600 cm$^{-1}$ in a Fourier transform infrared spectrum with a transmittance in a range of 30 to 50%.

7. The method of reducing the organic contaminant in the solution of claim 1, wherein the Fe—Co core-shell nanosphere reduces the organic contaminant concentration by adsorption.

8. The method of reducing the organic contaminant in the solution of claim 1, wherein the organic contaminant is a malachite green (MG) dye or a cationic textile dye.

9. The method of reducing the organic contaminant in the solution of claim 1,
   wherein the Fe—Co core-shell nanosphere is mixed with the solution for 70 to 200 minutes at 30 to 60° C.

10. The method of reducing the organic contaminant in the solution of claim 1, wherein the solution comprises the organic contaminant at a concentration of 0.2 to 100 mg/L, and
    wherein the Fe—Co core-shell nanosphere is mixed with the solution at a concentration of 0.1 to 2 mg/L and removes 80 to 99.9% of the organic contaminant.

11. The method of reducing the organic contaminant in the solution of claim 1, wherein the solution has a water flux of 180 to 260 L/m$^2$ h through the membrane, and the method achieves an organic contaminant removal efficiency of 80 to 99%.

12. The method of reducing the organic contaminant in the solution of claim 1, wherein an organic contaminant removal efficiency of 80 to 99% is achieved with 9 to 19% fouling resistances at a pressure of 0.02 to 0.1 bar across the membrane.

* * * * *